United States Patent
Saurabh et al.

(10) Patent No.: US 9,990,690 B2
(45) Date of Patent: Jun. 5, 2018

(54) EFFICIENT DISPLAY PROCESSING WITH PRE-FETCHING

(71) Applicant: QUALCOMM Incorporated, San Diego, CA (US)

(72) Inventors: Kumar Saurabh, Bangalore (IN); Sreekanth Modaikkal, Bangalore (IN); Anitha Madugiri Siddaraju, Bangalore (IN); Naveenchandra Shetty Brahmavar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 14/860,225

(22) Filed: Sep. 21, 2015

(65) Prior Publication Data

US 2017/0083999 A1 Mar. 23, 2017

(51) Int. Cl.
*G09G 5/39* (2006.01)
*G06T 1/60* (2006.01)
(Continued)

(52) U.S. Cl.
CPC .............. *G06T 1/60* (2013.01); *G09G 3/20* (2013.01); *G09G 5/399* (2013.01); *G09G 2360/122* (2013.01); *G09G 2360/18* (2013.01)

(58) Field of Classification Search
CPC .......... G06F 12/0862; G06F 2212/602; G06F 12/1027; G06F 13/1673; G06F 2212/69; G06F 3/064; G06F 12/0804; G06F 12/0873; G06F 2212/60; G06T 1/60; G06T 2207/20144; G06T 2207/20221; G06T 1/20; G06T 11/001; G06T 2210/36; G09G 3/20; G09G 5/399; H04N 19/40; H04N 21/235; H04N 21/435; H04N 21/234327; H04N 21/64792; H04N 21/2662; H04N 19/176; H04N 19/17; H04N 21/23614; H04N 19/174

See application file for complete search history.

(56) References Cited

U.S. PATENT DOCUMENTS

| 6,002,407 A | 12/1999 | Fadden |
| 8,405,678 B2 | 3/2013 | Cheng et al. |

(Continued)

OTHER PUBLICATIONS

International Search Report and Written Opinion from International Application No. PCT/US2016/044979, dated Nov. 2, 2016, 12 pp.

(Continued)

*Primary Examiner* — Xilin Guo

(74) *Attorney, Agent, or Firm* — Shumaker & Sieffert, P.A.

(57) ABSTRACT

In an example, a method for tile-based processing by a display processor may include reading first foreground tile data of a foreground image from a first memory space. The method may include storing the read first foreground tile data into a second memory space. The method may include reading first background tile data of a background image from the first memory space. The method may include storing the read first background tile data into a third memory space. The method may include reading a subset of data of the first foreground tile data from the second memory space. The method may include reading a subset of data of the first background tile data from the third memory space.

30 Claims, 10 Drawing Sheets

(51) Int. Cl.
    *G09G 5/399*     (2006.01)
    *G09G 3/20*     (2006.01)

(56) References Cited

U.S. PATENT DOCUMENTS

| | | |
|---|---|---|
| 8,803,920 B2 | 8/2014 | Kalai et al. |
| 8,988,443 B2 | 3/2015 | Croxford et al. |
| 8,994,741 B2 | 3/2015 | Bratt et al. |
| 2004/0057600 A1* | 3/2004 | Niwa .................... B60R 25/104 382/103 |
| 2004/0179019 A1* | 9/2004 | Sabella ................. G09G 5/393 345/537 |
| 2010/0158365 A1* | 6/2010 | Ishida ................ H04N 1/40062 382/166 |
| 2012/0131306 A1* | 5/2012 | Bratt ................... G06F 12/1027 711/205 |
| 2012/0268465 A1 | 10/2012 | Inada |
| 2015/0082000 A1 | 3/2015 | Hong et al. |

OTHER PUBLICATIONS

Neun M., et al., "Techniques for LBS Cartography", Retrieved from the Internet: URL:http://www.e-cartouche.ch/content_reg/cartouche/LBStech/en/text/LBStech.pdf [retrieved on May 3, 2016]; Jan. 26, 2012, XP055270378, 45 pp.

Second Written Opinion from International Application No. PCT/US2016/044979, dated Apr. 26, 2017, 8 pp.

International Preliminary Report on Patentability—PCT/US2016/044979, The International Bureau of WIPO—Geneva, Switzerland, Jul. 24, 2017, 33 pages.

* cited by examiner

| FG | FG | ... | FG | FG |
| BG | BG | ... | BG | BG |

|← 32 clock cycles (1st line in tile) →|← 32 clock cycles (2nd line in tile) →|

|←———————— 512 clock cycles (1 tile) ————————→|

FIG. 4A

| Lu | Lu | ... | Lu | Lu |
| Cb Cr | Cb Cr | ... | Cb Cr | Cb Cr |
| A R G B | A R G B | ... | A R G B | A R G B |

|← 32 clock cycles (1st line in tile) →|← 32 clock cycles (2nd line in tile) →|

|←———————— 512 clock cycles (1 tile) ————————→|

FIG. 4B

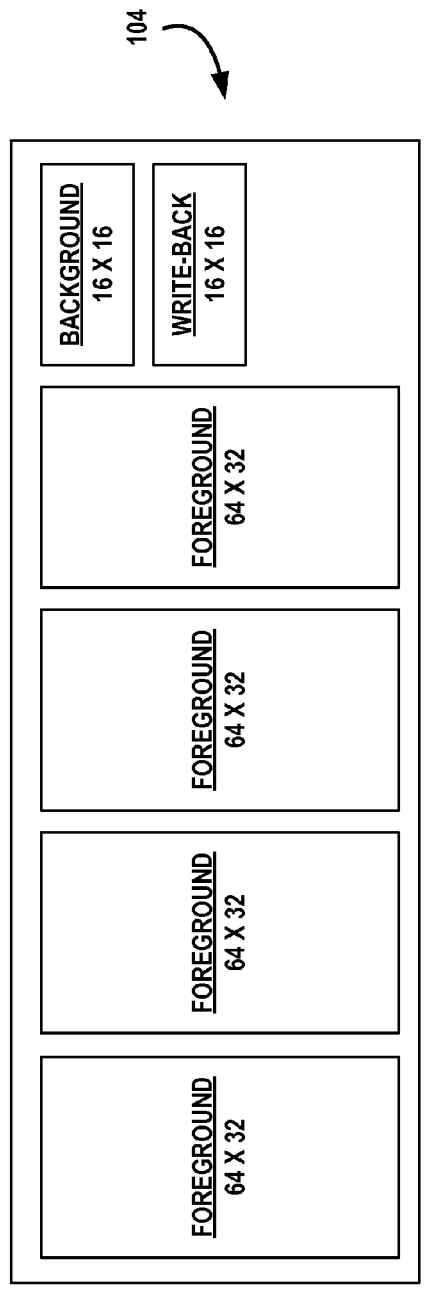
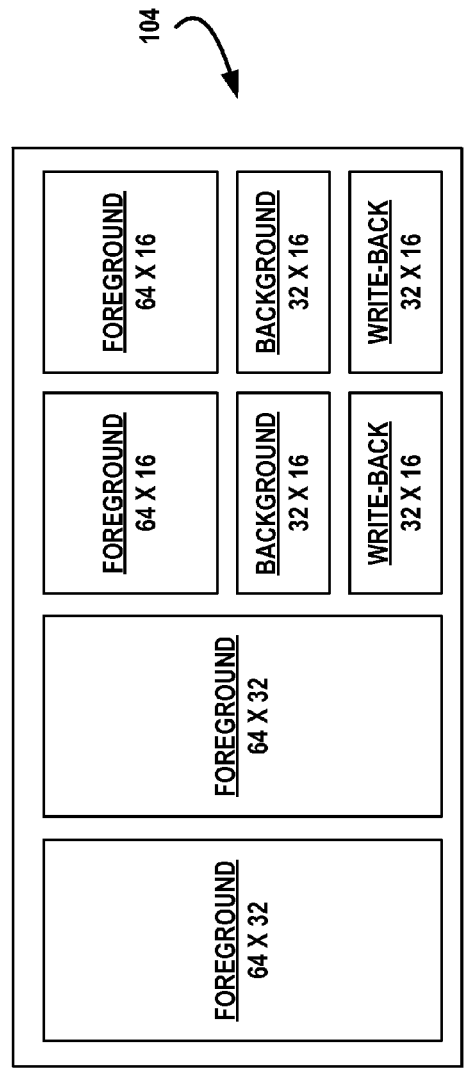
FIG. 5A
FIG. 5B

EFFICIENT DISPLAY PROCESSING WITH PRE-FETCHING

TECHNICAL FIELD

The disclosure relates to display processing of a display processor.

BACKGROUND

Visual content for display, such as content for graphical user interfaces and video games, may be generated by a graphics processing unit (GPU). For example, a display may be communicatively coupled to a display processor that processes graphical data (e.g., pixel representations) output by the GPU for presentment of the processed graphical data on the display.

Display processors often utilize a tile-based display architecture due to the area processing efficiency associated therewith. However, the tile fetching scheme and/or tile processing sequence of current display processors may be improved.

SUMMARY

Techniques of this disclosure relate to display processing of a display processor. Visual content may be generated or processed by a central processing unit (CPU), a graphics processing unit (GPU), a digital signal processor (DSP), a video processing unit, a camera processing unit, an image processing unit, a pixel processing unit, and/or another source. A display processor may be configured to receive visual content from any source. Certain aspects of this disclosure may, for example, be directed at reducing bandwidth/processing consumption of a display processor and/or reducing the number of memory requests to memory external by a display processor (e.g., system memory). Certain aspects of this disclosure may be directed at increasing throughput of a display processor. Certain aspects of this disclosure may be directed at increasing memory efficiency for pseudo planar format images.

In one example, this disclosure describes a method for tile-based processing by a display processor, the method comprising reading, by a pre-fetch processing unit of the display processor, first foreground tile data of a foreground image from a first memory space; storing, by the pre-fetch processing unit of the display processor, the read first foreground tile data into a second memory space; reading, by the pre-fetch processing unit of the display processor, first background tile data of a background image from the first memory space; storing, by the pre-fetch processing unit of the display processor, the read first background tile data into a third memory space; reading, by a fetch processing unit of the display processor, a subset of data of the first foreground tile data from the second memory space; and reading, by the fetch processing unit of the display processor, a subset of data of the first background tile data from the third memory space. In some examples, the first memory space may be a frame buffer, the second memory space may be a foreground ping-pong buffer, and the third memory space may be a background ping-pong buffer.

In another example, this disclosure describes a computing device, the computing device comprising a first memory space; a second memory space for storing foreground tile data of a foreground image; a third memory space for storing background tile data of a background image; and a display processor including a pre-fetch processing unit and a fetch processing unit. The pre-fetch processing unit may be configured to read first foreground tile data of the foreground image from the first memory space, store the read first foreground tile data into the second memory space, read first background tile data of the background image from the first memory space, and store the read first background tile data into the third memory space. The fetch processing unit may be configured to read a subset of data of the first foreground tile data from the second memory space, and read a subset of data of the first background tile data from the third memory space. In some examples, the first memory space may be a frame buffer, the second memory space may be a foreground ping-pong buffer, and the third memory space may be a background ping-pong buffer.

In another example, this disclosure describes an apparatus, the apparatus comprising means for reading first foreground tile data of a foreground image from a first memory space; means for storing the read first foreground tile data into a second memory space; means for reading first background tile data of a background image from the first memory space; means for storing the read first background tile data into a third memory space; means for reading a subset of data of the first foreground tile data from the second memory space; and means for reading a subset of data of the first background tile data from the third memory space. In some examples, the first memory space may be a frame buffer, the second memory space may be a foreground ping-pong buffer, and the third memory space may be a background ping-pong buffer.

In another example, this disclosure describes a non-transitory computer-readable storage medium having instructions stored thereon that, when executed, cause one or more processors of a computing device configured to: read first foreground tile data of a foreground image from a first memory space; store the read first foreground tile data into a second memory space; read first background tile data of a background image from the first memory space; store the read first background tile data into a third memory space; read a subset of data of the first foreground tile data from the second memory space; and read a subset of data of the first background tile data from the third memory space. In some examples, the first memory space may be a frame buffer, the second memory space may be a foreground ping-pong buffer, and the third memory space may be a background ping-pong buffer.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a conceptual diagram illustrating an example of parallelization of processing foreground and background tiles.

FIG. 4B is a conceptual diagram illustrating an example of parallelization of processing foreground and background tiles.

FIG. 5A illustrates an example of memory allocation for ping-pong buffer space.

FIG. 5B illustrates an example of memory allocation for ping-pong buffer space.

DETAILED DESCRIPTION

In general, aspects of the disclosure are directed to improving the performance of a computing system in displaying visual content, such as a set of image frames (e.g., a graphical animation, a video, a video game, and the like) or a single image frame (e.g., a still image). Visual content may be generated by a CPU, a GPU, a DSP, a video processing unit, a camera processing unit, an image processing unit, a pixel processing unit, and/or another source. A display processor configured to perform one or more techniques of this disclosure may be configured to receive visual content from any source. For example, a display processor configured to perform one or more techniques of this disclosure may be communicatively coupled (wired, wirelessly, or a combination thereof) to any source that may generate or process visual content. As another example, a display processor configured to perform one or more techniques of this disclosure may be communicatively coupled (wired, wirelessly, or a combination thereof) to any memory configured to store visual content. In such an example, a display processor configured to perform one or more techniques of this disclosure may be configured to receive visual content from any memory storing visual content.

In one example of this disclosure, a display processor may be configured to pre-fetch foreground and background tile data from memory (e.g., a frame buffer), and store the pre-fetched tile data into a foreground ping-pong buffer and a background ping-pong buffer, respectively. Pre-fetching tile data from memory may reduce the number of memory requests to the memory by requesting memory in, for example, larger chucks than typically requested. As another example, certain aspects of this disclosure may be directed at increasing throughput of a display processor. As another example, certain aspects of this disclosure may be directed at increasing memory efficiency for pseudo planar format frame(s). For example, a display processor in accordance with one or more techniques of this disclosure may pre-fetch chroma and luma as individual tiles without alternating between each line of the chroma and luma tiles during the pre-fetch process.

Figure 1:
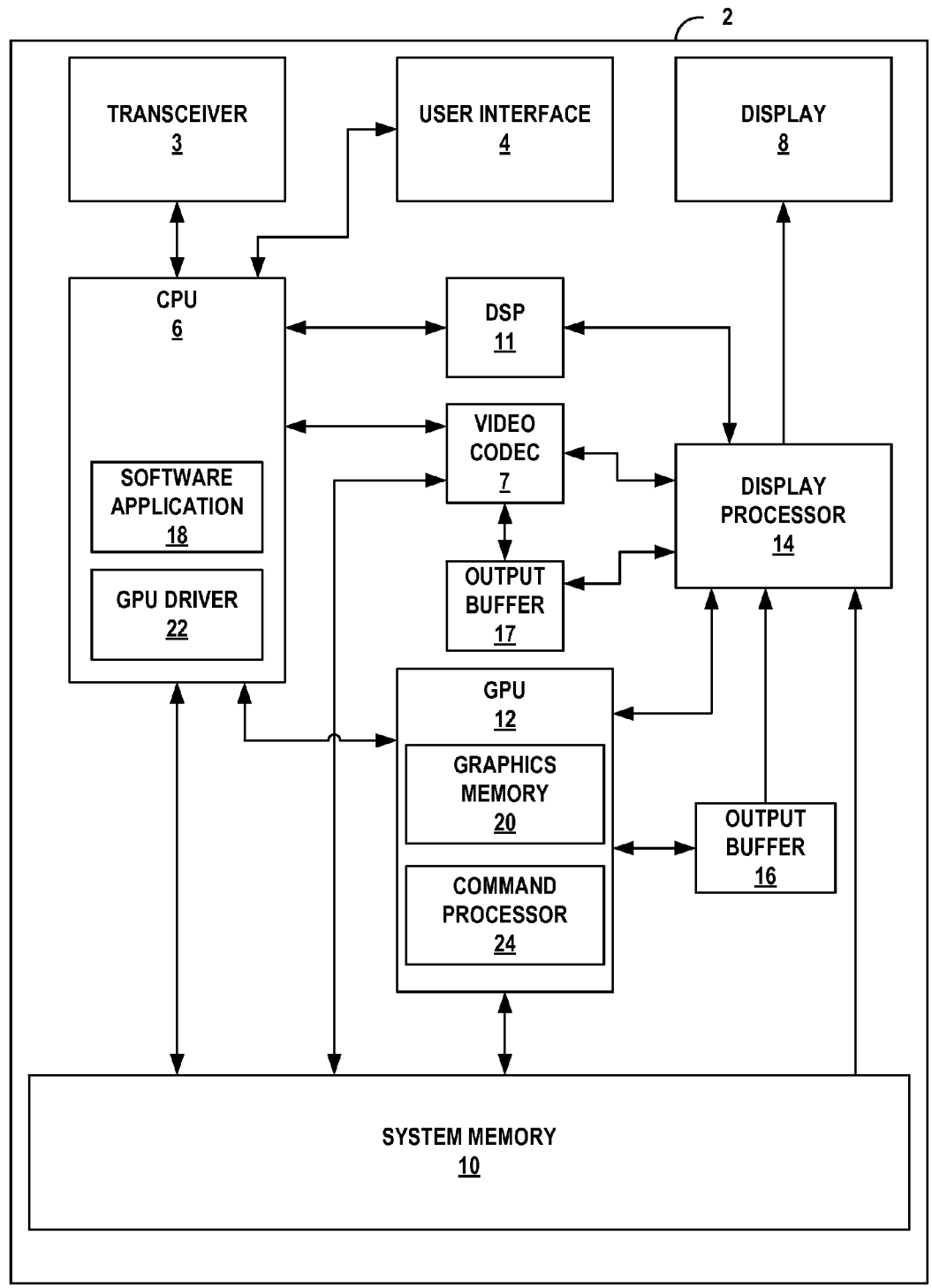
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, computing device 2 may be a computing device including but not limited to video devices, media players, set-top boxes, wireless handsets such as mobile telephones and so-called smartphones, personal digital assistants (PDAs), wearable computing devices, desktop computers, laptop computers, gaming consoles, video conferencing units, tablet computing devices, and the like. In some examples, computing device 2 may be a mobile communication device. In the example of FIG. 1, computing device 2 may include central processing unit (CPU) 6, system memory 10, and GPU 12. Computing device 2 may also include digital signal processor (DSP) 11, display processor 14, transceiver 3, user interface 4, video codec 7, and display device 8. In some examples, video codec 7 may be a software application, such as a software application 18 configured to be processed by CPU 6. In other examples, video codec 7 may be a hardware component different from CPU 6, a software application that runs on a component different from CPU 6, or a combination of hardware and software.

The configuration of display processor 14 in FIG. 1 is exemplary. In other examples, display processor 14 may be configured to receive visual content from any source, such as any CPU (e.g., CPU 6), any GPU (e.g., GPU 12), any DSP, any video processing unit, any camera processing unit, any image processing unit, any pixel processing unit, any memory storing visual content, or any other source. As one example, display processor 14 may be configured to receive visual content data from another device (e.g., another computing device 2, a server, or any device different from computing device 2 to which computing device 2 may be configured to permanently or temporarily communicatively couple). In such an example, computing device 2 may receive visual content at transceiver 3. Display processor 14 may be configured to process visual content received by transceiver 3. In some examples, display processor 14 may receive visual content directly from transceiver 3. In other examples, display processor 14 may receive visual content received by transceiver 3 from CPU 6, GPU 12, or any other processing unit of computing device 2. In such examples, display processor 14 may receive visual content as it was received by transceiver 3 or as further processed visual content by, for example, CPU 6, GPU 12, or any other processing unit of computing device 2.

As used herein, the term "visual content" includes but is not limited to any graphics data, graphical data, video data, image data, pixel data, graphics content, graphical content, video content, image content, and/or pixel content.

In view of the various configurations of display processor 14, display processor 14 may be configured to perform any function described herein with respect to any source of visual content (e.g., any processing unit or any memory storing visual content). For example, while FIG. 1 is described with display processor 14 being configured to pre-fetch and/or fetch visual content (e.g., one or more image layers) from memory such as a frame buffer to which a GPU outputs graphical data, display processor 14 may be configured to pre-fetch and/or fetch visual content from any processing unit configured to process visual content and/or any memory configured to store visual content (e.g., any on-chip memory of any processing unit configured to process visual content, any memory external to any processing unit configured to process visual content, or any other memory).

Display processor 14 may utilize a tile-based architecture. In other examples, display processor 14 may utilize a line-based architecture. In such examples, display processor 14 may be configured to implement one or more techniques of this disclosure for line-based display processing as well as tile-based display processing.

In some examples, a tile is an area representation of pixels comprising a height and width with the height being one or more pixels and the width being one or more pixels. In such examples, tiles may be rectangular or square in nature. In other examples, a tile may be a shape different than a square or a rectangle. Display processor 14 may pre-fetch or fetch multiple image layers (e.g., foreground and background) from memory (e.g., a frame buffer to which a GPU outputs graphical data in the form of pixel representations and/or other memory). Display processor 14 may process pixels from multiple layers. Example processing that may be performed by display processor 14 may include up-sampling, down-sampling, scaling, rotation, and other pixel processing. For example, display processor 14 may process pixels associated with foreground image layers and/or background image layers. Display processor 14 may blend pixels from multiple layers, and write back the blended pixels into memory in tile format. Then, the blended pixels are read from memory in raster format and sent to display 8 for presentment.

Video codec 7 may receive encoded video data. Computing device 2 may receive encoded video data from a source device (e.g., a device that encoded the data or otherwise transmitted the encoded video data to computing device 2, such as a server). In other examples, computing device 2 may itself generate the encoded video data. For example, computing device 2 may include a camera for capturing still images or video. The captured data (e.g., video data) may be encoded by video codec 7. Encoded video data may include a variety of syntax elements generated by a video encoder for use by a video decoder, such as video codec 7, in decoding the video data. While video codec 7 is described herein as being both a video encoder and video decoder, it is understood that video codec 7 may be a video decoder without encoding functionality in other examples. Video data decoded by video codec 7 may be sent directly to display processor 14, may be sent directly to display 8, or may be sent to memory accessible to display processor 14 or GPU 12 such as system memory 10, output buffer 16, or output buffer 17. In the example shown, video codec 7 is connected to display processor 14 meaning that decoded video data is sent directly to display processor 14 and/or stored in memory accessible to display processor 14. In such an example, display processor 14 may issue one or more memory requests to obtain decoded video data from memory in a similar manner as when issuing one or more memory requests to obtain graphical (still image or video) data from memory (e.g., output buffer 16) associated with GPU 12.

Transceiver 3, video codec 7, and display processor 14 may be part of the same integrated circuit (IC) as CPU 6 and/or GPU 12, may be external to the IC or ICs that include CPU 6 and/or GPU 12, or may be formed in the IC that is external to the IC that includes CPU 6 and/or GPU 12. For example, video codec 7 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof.

Display processor may 14 may fetch/pre-fetch multiple image layers (e.g., foreground and background layers) from at least one memory (e.g., on-chip memory of CPU 6, on-chip memory of video codec 7, on-chip memory of GPU 12, on-chip memory of DSP 11, output buffer 16, output buffer 17, system memory 10, any other memory, or any combinations thereof). The multiple image layers may include foreground layers and background layers. As used herein, the term "image" is not intended to mean only a still image. Rather, an image or image layer may be associated with a still image (e.g., the image or image layers when blended may be the image) or a video (e.g., the image or image layers when blended may be a single image in a sequence of images that when viewed in sequence create a moving picture or video).

A foreground image layer (or simply foreground image) and a background image layer (or simply background image) may be any visual content. For example, a foreground image may constitute video data and the background image may constitute graphics data. In such an example, the foreground image may be generated by GPU 12 or generated by video codec 7 (e.g., by decoding encoded video data or encoded image data). The background image may, for example, be generated by GPU 12. In other examples, the background image may be generated by video codec 7 (e.g., by decoding encoded video data or encoded image data). In some examples, the foreground images and background images processed by display processor 14 are read from a frame buffer (e.g., output buffer 16). In other examples, a foreground image may constitute graphics data and a background image may constitute graphics data.

In some examples, the foreground image layer may support video data and/or graphics data. In such examples, the foreground image layer may conform to the YUV color format (e.g., YCbCr color format, YUV420 pseudoplanar color format, YUV422 pseudoplanar color format, YUV444 planar color format, YUYV interleave color format, and YUV color formats) for video data. The foreground image layer may conform to the Red, Green, Blue (RGB) color format (e.g., ARGB8888, RGB888, RGB444, RGB565, and other RGB or RGBA color formats) for graphics data.

Red, Green, Blue, Alpha (RGBA) components for each pixel where the "RGB" components correspond to color values and the "A" component corresponds to a destination alpha value. As another example, output buffer 16 and/or output buffer 17 may store pixel data according to the YCbCr color format, YUV color format, RGB color format, or according to any other color format Computing device 2 may include additional modules or processing units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a camera. Furthermore, the various modules and units shown in computing device 2 may not be necessary in every example of computing device 2. For example, user interface 4 and display device 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display device 8. Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with CPU 6.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as software application 18. The software applications (e.g., software application 18) that execute on CPU 6 may include, for example, an operating system, a word processor application, an email application, a spreadsheet application, a media player application, a video game application, a graphical user interface application, or another type of software application that uses graphical data for 2D or 3D graphics. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

Software application 18 that execute on CPU 6 may include one or more graphics rendering instructions that instruct CPU 6 to cause the rendering of graphics data to display device 8. The instructions may include instructions to process 3D graphics as well as instructions to process 2D graphics. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™) or any other public or proprietary standard GPU compute API. In order to process the graphics rendering instructions of software application 18 executing on CPU 6, CPU 6, during execution of software application 18, may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

Software application 18 may include one or more drawing instructions that instruct GPU 12 to render a graphical user interface (GUI), a graphics scene, graphical data, or other graphics related data. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

GPU 12 may be configured to perform graphics operations to render one or more graphics primitives to display device 8. Thus, when software applications 18 executing on CPU 6 requires graphics processing, CPU 6 may provide graphics rendering commands along with graphics data to GPU 12 for rendering to display device 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display device 8 more quickly than drawing the scenes directly to display device 8 using CPU 6.

Software application 18 may invoke GPU driver 22, to issue one or more commands to GPU 12 for rendering one or more graphics primitives into displayable graphics images (e.g., displayable graphical data). For example, software application 18 may invoke GPU driver 22 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors of GPU 12 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 accessible to display processor 14. In some examples, the graphics processing pipeline may include fixed function logic and/or be executed on programmable shader cores.

Output buffer 16 stores destination pixels for GPU 12. Each destination pixel may be associated with a unique screen pixel location. Similarly, output buffer 17 may store destination pixels for video codec 7 depending on the example. Output buffer 17 may be considered a frame buffer associated with video codec 7. In some examples, output buffer 16 and/or output buffer 17 may store color components and a destination alpha value for each destination pixel. For example, output buffer 16 and/or output buffer 17 may store pixel data according to any format. For example, output buffer 16 and/or output buffer 17 may store Red, Green, Blue, Alpha (RGBA) components for each pixel where the "RGB" components correspond to color values and the "A" component corresponds to a destination alpha value. As another example, output buffer 16 and/or output buffer 17 may store pixel data according to the YCbCr color format, YUV color format, RGB color format, or according to any other color format. Although output buffer 16 and system memory 10 are illustrated as being separate memory units, in other examples, output buffer 16 may be part of system memory 10. For example, output buffer 16 may be allocated memory space in system memory 10. Output buffer 16 may constitute a frame buffer. Further, as discussed above, output buffer 16 may also be able to store any suitable data other than pixels.

Similarly, although output buffer 17 and system memory 10 are illustrated as being separate memory units, in other examples, output buffer 17 may be part of system memory 10. For example, output buffer 17 may be allocated memory space in system memory 10. Output buffer 17 may constitute a video codec buffer or a frame buffer. Further, as discussed above, output buffer 17 may also be able to store any suitable data other than pixels. In some examples, although output buffer 16 and output buffer 17 are illustrated as being separate memory units, output buffer 16 and output buffer 17 may be the same buffer or different parts of the same buffer.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC) GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

In some examples, graphics memory 20 may be part of GPU 12. For example, graphics memory 20 may be on-chip memory or memory that is physically integrated into the integrated circuit chip of GPU 12. If graphics memory 20 is on-chip, GPU 12 may be able to read values from or write values to graphics memory 20 more quickly than reading values from or writing values to system memory 10 via a system bus. Thus, GPU 12 may read data from and write data to graphics memory 20 without using a bus. In other words, GPU 12 may process data locally using a local storage, instead of off-chip memory. Such graphics memory 20 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or output buffer 16 and output values that cause the pixels of display device 8 to illuminate to display the image. In some examples, display processor 14 may be configured to perform 2D operations on data to be displayed, including scaling, rotation, blending, and compositing. Display device 8 may be the display of computing device 2 that displays the image content generated by GPU 12. Display device 8 may be a liquid crystal display (LCD), an organic light emitting diode display (OLED), a cathode ray tube (CRT) display, a plasma display, or another type of display device. In some examples, display 8 may be integrated within computing device 2. For instance, display 8 may be a screen of a mobile telephone. In other examples, display 8 may be a stand-alone device coupled to computing device 2 via a wired or wireless communications link. For example, display 8 may be a computer monitor or flat panel display connected to a computing device (e.g., personal computer, mobile computer, tablet, mobile phone, etc) via a cable or wireless link.

CPU 6 processes instructions for execution within computing device 2. CPU 6 may generate a command stream using a driver (e.g., GPU driver 22 which may be implemented in software executed by CPU 6) for execution by GPU 12. That is, CPU 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphics data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6. Examples include a variety of image processing functions, including video decoding and post processing (e.g., deblocking, noise reduction, color correction, and the like) and other application specific image processing functions (e.g., facial detection/recognition, pattern recognition, wavelet transforms, and the like). In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor.

GPU driver 22 may communicate, to GPU 12, one or more command streams that may be executed by shader units of GPU 12. GPU 12 may include command processor 24 that may receive the one or more command streams from GPU driver 22. Command processor 24 may be any combination of hardware and software configured to receive and process one or more command streams. As such, command processor 24 is a stream processor. In some examples, instead of command processor 24, any other suitable stream processor may be usable in place of command processor 24 to receive and process one or more command streams and to perform the techniques disclosed herein. In one example, command processor 24 may be a hardware processor. In the example shown in FIG. 1, command processor 24 may be included in GPU 12. In other examples, command processor 24 may be a unit that is separate from CPU 6 and GPU 12. Command processor 24 may also be known as a stream processor, command/stream processor, and the like to indicate that it may be any processor configured to receive streams of commands and/or operations.

Command processor 24 may process one or more command streams including scheduling operations included in the one or more command streams for execution by GPU 12. Specifically, command processor 24 may process the one or more command streams and schedule the operations in the one or more command streams for execution by shader units 46. In operation, GPU driver 22 may send to command processor 24 a command stream comprising a series of operations to be executed by GPU 12. Command processor 24 may receive the stream of operations that comprise the command stream and may process the operations of the command stream sequentially based on the order of the operations in the command stream and may schedule the operations in the command stream for execution by shader processors of shader units of GPU 12.

Display processor 14 may implement various techniques described herein to, for example, reduce or remove bandwidth wastage, reduce the number of memory requests made by display processor 14 to initially acquire tile data, and/or enable parallel fetching of foreground and background tiles to increase throughput. Various other benefits may also be derived from various techniques described herein.

Figure 2:
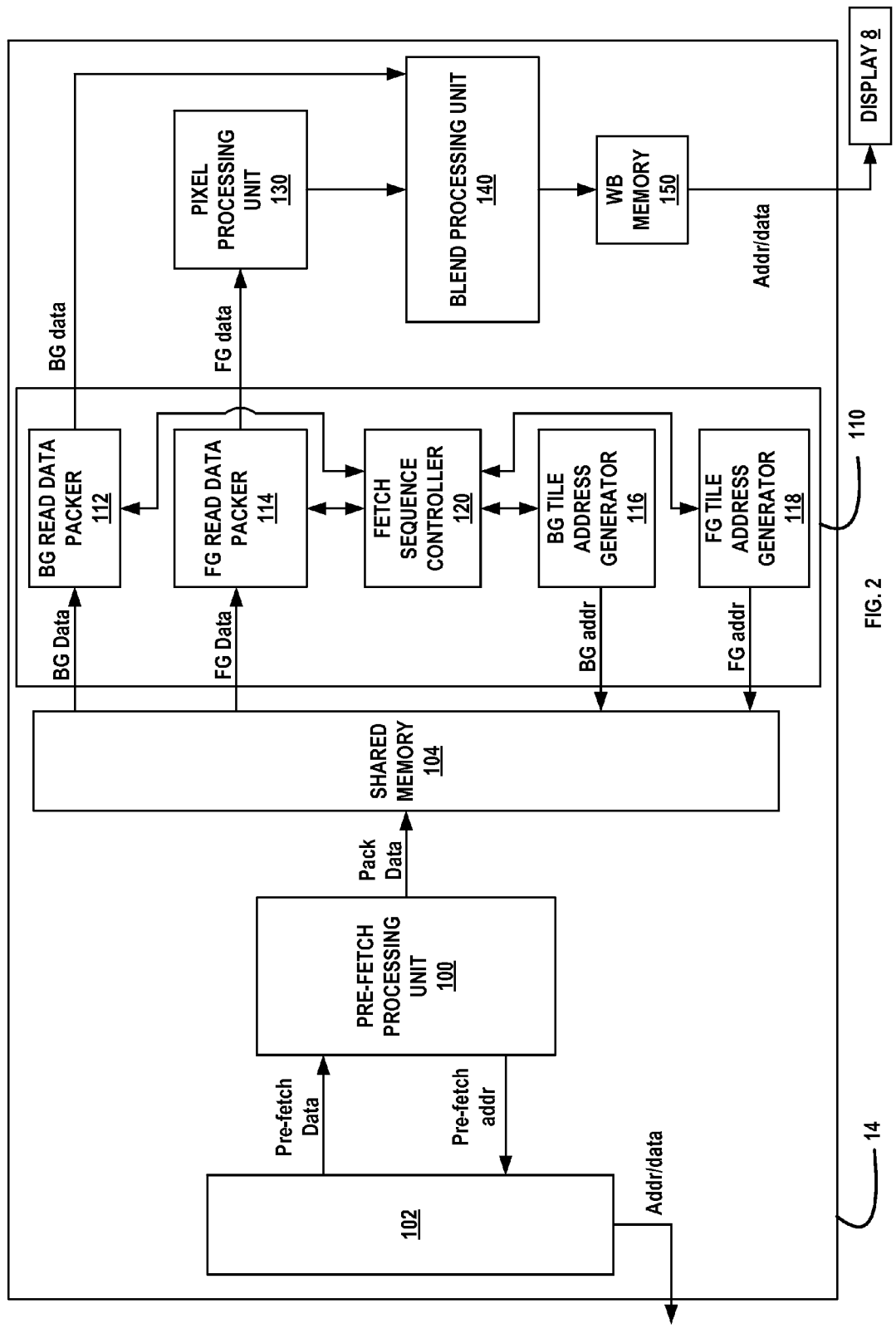
FIG. 2 is a block diagram illustrating an example of a display processor described in this disclosure.

FIG. 2 is a conceptual diagram illustrating display processor 14 consistent with techniques of this disclosure. Display processor 14 includes a pre-fetch processing unit 100 in communication with a bus interface 102. In some examples, pre-fetch processing unit 100 is a fixed function circuit that has address generator logic to generate memory address requests to external memory (e.g., off-chip memory such as system memory 10, output buffer 16, and/or output buffer 17). Pre-fetch processing unit 100 pre-fetches foreground and background layer pixel data from the external memory stored at the generated memory addresses.

In some examples, bus interface 102 may be an Advanced eXtensible Interface (AXI) interface that communicates with system components in accordance with the AXI protocol. For example, bus interface 102 may constitute an AXI master interface and components with which it communicates may constitute AXI slaves. In other examples, bus interface 102 may be a bus interface different from an AXI interface. Bus interface 102 may enable display processor 14 to communicate with other system components, such as GPU 12, output buffer 16, video codec 7, and/or system memory 10. Pre-fetch processing unit 100 is in communication with shared memory 104. In some examples, shared memory 104 may be memory space in system memory 10. In other examples, shared memory 104 may be memory space in an external memory different from system memory 10. In other examples, shared memory 104 may be memory space in a memory on display processor 14 (e.g., on-chip memory). Components of display processor 14, such as pre-fetch processing unit 100, fetch processing unit 110, pixel processing unit 130, and/or blend processing unit 140, may utilize a bus interface as appropriate to access shared memory 104 depending on the example.

Display processor 14 may include fetch processing unit 110, which includes BG read data packer 112 for fetching background tile data and FG read data packer 114 for fetching foreground tile data. Fetch processing unit 110 also includes BG tile address generator 116 and FG tile address generator 118.

In some examples, FG read data packer 114 and BG read data packer 112 may be the same physical module that functions as both FG read data packer 114 and BG read data packer 112. In other examples, FG read data packer 114 and BG read data packer 112 may be the same physical module that that is instantiated twice: one instantiation for the FG read data packer 114 and one instantiation for the BG read data packer 112. In such examples, each instantiation is a separate physical module that has the same fixed-function circuitry.

In some examples, FG tile address generator 118 and BG tile address generator 116 may be the same physical module that functions as both FG tile address generator 118 and BG tile address generator 116. In other examples, FG tile address generator 118 and BG tile address generator 116 may be the same physical module that that is instantiated twice: one instantiation for the FG tile address generator 118 and one instantiation for the BG tile address generator 116. In such examples, each instantiation is a separate physical module that has the same fixed-function circuitry.

In some examples, shared memory 104 is filled or otherwise written to by pre-fetch processing unit 100 in a fixed pattern of 64 pixels×Height (H) pixels. Fetch processing unit 110 may read tile data from shared memory 104 to pack each line of foreground tile data from shared memory 104 for downstream processing. Downstream processing may include, for example, any processing performed by pixel processing unit 130 and/or blend processing unit 140. FG tile address generator 118 may generate memory addresses used for fetching a foreground tile having the dimensions of Width (W)×Height (H) pixels where W may be less than, equal to, or greater than 64 pixels. Using the addresses generated by FG tile address generator 118, FG read data packer 114 reads foreground tile data from shared memory 104 and may pack each line of the foreground tile data. Once packed, FG read data packer 114 may send each packed line downstream for processing.

Similar to FG tile address generator 118, BG tile address generator 116 may generate memory addresses used for fetching a background tile having the dimensions of 16 pixels×16 pixels. In other examples, BG tile address generator 116 may generate memory addresses used for fetching a background tile having the dimensions of Width (W)×Height (H) pixels.

In some examples, the read and write interface of shared memory 104 is 64 bits meaning that 64 bits of foreground tile data may be written to and/or read from shared memory 104 at a time. Pre-fetch processing unit 100 may read data from external memory (e.g., off-chip memory such as system memory 10, output buffer 16, and/or output buffer 17) in 64-bit chunks. Pre-fetch processing unit 100 stores the 64-bit chunks of pixel data in shared memory 104. Each bit of a single 64-bit line of pixel data may or may not correspond to one line of the actual foreground tile data. Such non-correspondence may occur, for example, where the 64-bit line contains pixel data for more than one foreground tile. FG read data packer 114 and BG read data packer 112 each reads the required pixel data for a tile from shared memory 104 using the addresses respectfully generated by FG tile address generator 118 and BG tile address generator 116. FG read data packer 114 and BG read data packer 112 each respectively form a foreground tile of size W×H and a background tile of size W×H. In some examples, the size of the background tile formed by BG read data packer 112 is fixed at 16 pixels×16 pixels.

BG read data packer 112, FG read data packer 114, BG tile address generator 116, and FG tile address generator 118 are each in communication with fetch sequence controller 120. Fetch sequence controller 120 may issue instructions to or respond to instructions from BG read data packer 112, FG read data packer 114, BG tile address generator 116, and FG tile address generator 118. Similarly, each of BG read data packer 112, FG read data packer 114, BG tile address generator 116, and FG tile address generator 118 may issue instructions to or respond to instructions from fetch sequence controller 120.

In some examples, fetch sequence controller 120 controls the fetch sequence of each plane corresponding to a frame of graphical data. For example, a YUV formatted image frame may be stored in DDR as a single plane (referred to as interleave format), two planes (referred to as pseudoplanar format), or three planes (referred to as planar format). In such examples, depending on the format, there can be up to three planes associated with each frame. For example, in the case of a foreground tile, one or more planes of data may be fetched. Fetch sequence controller 120 may ensure that each of the one or more planes is fetched from shared memory 104 for each foreground and background tile. Depending on the color format, fetch sequence controller 120 may be configured to interleave one or more color channels into one or more planes during fetching. In some examples, any downstream processing (e.g., downstream processing performed by pixel processing unit 130) may be performed on each pixel rather than component of each pixel. To do so, fetch sequence controller 120 may control how each plane corresponding to each tile is fetched. For example, fetch sequence controller 120 may control the sequential fetching of each plane corresponding to each tile. As another example, fetch sequence controller may control the interleaved fetching of two or more planes. In this example, fetch sequence controller 120 may alternate between fetching each line of Cb and Cr planes. As another example, fetch sequence controller 120 may fetch a single plane for an RGB color formatted tile where the different color channels are interleaved. As another example, fetch sequence controller 120 may be configured to fetch three planes in the case of a tile that conforms to the YUV color format or YUV plus alpha color format.

In addition to controlling the fetching sequence of tile data, fetch sequence controller 120 may generate the input tile size to be fetched for each plane. As an example, fetch sequence controller may generate the input tile size to be fetched for Y, Cb, and Cr planes based on the scale ratio and format. Fetch sequence controller 120 may also update memory pointers that FG tile address generator 118 and BG tile address generator 116 use in generating the addresses from which FG read data packer 114 and BG read data packer 112 read tile data from shared memory 104.

Fetch processing unit 110 may be configured to control the fetching of pre-fetched foreground and pre-fetched background tile data stored in shared memory 104. Additional detail concerning fetch processing unit 110 is provided throughout this disclosure.

While shared memory 104 is shown as being positioned between pre-fetch processing unit 100 and fetch processing unit 110, it is understood that that FIG. 2 is a conceptual diagram. Therefore, in some examples, such placement of shared memory 104 may exist as such. However, in other examples, shared memory 104 may or may not be disposed as shown in FIG. 2. One commonality among all examples, however, is that pre-fetch processing unit 100 and fetch processing unit 110 are in communication with shared memory 104, whether directly or indirectly (e.g., indirectly through another component).

Display processor 14 may include a pixel processing unit 130 configured to perform pixel processing (e.g., upscaling, downscaling, and other pixel processing). Display processor 14 may include a blend processing unit 140. Blend processing unit 140 may be configured to blend foreground tile data with background tile data to create blended tile data for presentment on a display, such as display 8. For example, foreground tile data and background tile data may respectively be considered as a portion of a foreground image layer and a background image layer. Blend processing unit 140 may blend tiles of a foreground image layer and a background image layer together to create a blended image layer. The blended image layer may form a frame for display.

Pre-fetch processing unit 100 may be configured to pre-fetch foreground and/or background tile data from at least one memory (e.g., on-chip memory of video codec 7, on-chip memory of GPU 12, output buffer 16, and/or system memory 10). As an example, pre-fetch processing unit 100 may be configured to pre-fetch tile data from off-chip memory such as a DDR memory. As another example, pre-fetch processing unit 100 may be configured to pre-fetch tile data from off-chip memory such as on-chip memory of video codec 7 or on-chip memory of GPU 12, but this requires at least enough memory be allocated in such on-chip memory of video codec 7 and/or GPU 12 for at least one frame which is more costly than simply pre-fetching from external memory to not only display processor 14, but also video codec 7 and GPU 12. Pre-fetch processing unit 100 may be configured to store pre-fetched data in memory space (e.g., shared memory 104). Fetch processing unit 110 may be configured to fetch pre-fetched foreground tile data and background tile data from the memory space utilized by pre-fetch processing unit 100. In some examples, the memory utilized by fetch processing unit 110 may only be accessible to display processor 14. As one example, the memory utilized by fetch processing unit 110 may be on-chip memory of display processor 14. As another example, the memory utilized by fetch processing unit 110 may be external memory (e.g., system memory 10) to display processor 14, but allocated such that only display processor 14 is allowed to access the designated memory space. Otherwise stated, while system memory 10 may broadly be accessible to many components of computing device 2, memory space of system memory 10 may be partitioned with access rights in some examples.

Pixel processing unit 130 may perform pixel processing on tile data (e.g., foreground tile data) received from fetch processing unit 110. Some examples of pixel processing include up-sampling, down-sampling, scaling, color conversion, rotation, and other pixel processing techniques. Two examples of up-sampling include converting an input format conforming to the YUV420 or YUV422 format to YUV444. Any scaling performed by pixel processing unit 130 may be performed on fully up-sampled pixels. One example of color conversion includes converting an input format conforming to a YUV color format to an RGB color format. Another example of color conversion includes converting an input format conforming to a RGB color format to a YUV color format. Examples of rotation pixel processing may include rotating an image 90, 180, or 270 degrees. Pixel processing unit 130 may store processed tile data in memory (e.g., random-access memory (RAM)).

Regarding scaling, the input size of foreground tile to the scaling engine of pixel processing unit 130 varies depending on the scale ratio associated with the foreground tile. In this regard, the foreground tile may be of varying size. However, by de-coupling the foreground tile size from external memory requests by using pre-fetch processing unit 100, bandwidth wastage may be reduced. For example, instead of fetch processing unit 110 requesting each foreground tile of varying size from an external memory, pre-fetch processing unit 100 reads foreground tile data from external memory in fixed increments, such as 64 pixel increments, independent of any scaling ratio and stores the pre-fetched data in shared memory space 104. In turn, fetch processing unit 110 may read foreground tile data from shared memory space 104 based on any scaling ratio meaning that the read request size is not fixed because it is dependent on a scaling ratio, unlike the read request size for pre-fetch processing unit 100 which is independent of any scaling ratio. As otherwise stated and described herein, pre-fetch processing unit 100 compensates for the bandwidth wastage by utilizing a pre-fetch ping-pong buffer.

After pixel processing is performed on the fetched foreground tile data, pixel processing unit 130 may output the processed foreground tile to blend processing unit 140. Blend processing unit 140 may request that pixel processing unit 130 transmit the processed tile data to blend processing unit 140 (e.g., blend processing unit 140 may pull processed tile data from pixel processing unit 130). Pixel processing unit 130 may transmit processed tile data to blend processing unit 140 without receiving a request to do so from blend processing unit 140 (e.g., pixel processing unit 130 may push processed tile data to blend processing unit 140).

Blend processing unit 140 may blend fetched background tile data (e.g., one or more tiles) with fetched foreground tile data (e.g., one or more tiles) that may or may not have been processed by pixel processing unit 130 to create blended tiles (e.g., one or more blended tiles). For example, if one background tile is blended with one foreground tile, then a blended tile is generated by blend processing unit 140. As another example, if two adjacent foreground tiles are blended with two adjacent background tiles, then the blended tile data generated by blend processing unit 140 would be two adjacent blended tiles. In some examples, foreground tile data that need not be processed by pixel processing unit 130 may bypass pixel processing unit 130 and instead be sent directly to blend processing unit 140. In such examples, fetch sequence controller 120 or foreground read data packer 114 may make this determination resulting in foreground read data packer 114 transmitting such foreground tile data to blend processing 140 instead of pixel processing unit 130. In some examples, the blended tile data is written back (depicted at block 150) to memory (e.g., shared memory 104). In such examples, this memory space is often referred to as write back memory. Pixels of blended tiles are read from this memory space (e.g., write back memory in system memory) in raster order by display processor 14 and sent to display 8 for presentment. For example, display processor 14 may include a Direct Memory Access (DMA) controller that reads a blended frame (i.e., a frame comprising blended pixels) from write back memory. The DMA controller may transmit the blended frame to display 8, or the DMA may further process the blended frame before transmitting the blended frame to display 8. For example, the DMA may perform gamut mapping or color correction. In some examples, display processor 14 may perform additional processing on the blended frame before sending the blended frame to display 8. For example, display processor 14 may perform color adjustments and/or other corrections to the blended frame before transmitting the blended frame to display 8.

As used herein, the term data may refer to pixel data depending on the context. For example, the term tile data refers to pixel data. As another example, the term foreground tile data refers to foreground pixel data. Additionally, the term tile data may be referred to as a pixel representation or a tiled pixel representation. Pixel data may conform to a color format of one or more bits. For example, each pixel in tile data may be represented by one or more bits depending on the color format.

As described herein, pre-fetch processing unit 100 may be configured to store pre-fetched data in memory space, such as a shared memory 104. In some examples, such a memory space may be a ping-pong buffer or a ping-pong circular buffer. The ping-pong buffer may be memory space in shared memory 104. The ping-pong buffer in shared memory 104 may constitute a ping-pong circular buffer according to some examples. As used herein, the term "ping-pong buffer" may include a non-circular (e.g., not a virtual ring) or a circular (e.g., a virtual ring) buffer. In some examples, the term "ping-pong buffer" may refer to a page-flipping buffer or a double buffering buffer configured to perform one or more techniques described herein. In other examples, the term "ping-pong buffer" may refer to a triple buffering buffer or a quad buffering buffer configured to perform one or more techniques described herein. In some examples, the term "ping-pong buffer" may refer to a double buffer (e.g., the ping buffer and the pong buffer). The ping buffer and the pong buffer may be treated as a non-circular buffer and/or a circular. How the ping buffer and the pong buffer is treated may depend on whether data is being written to the buffer or read from the buffer. In some examples, the term "ping-pong buffer" may refer to a double buffer (e.g., the ping buffer and the pong buffer) in which data may be written to one of the buffers (e.g., the ping buffer) while data is being read from the other buffer (e.g., the pong buffer). If data is being written to the pong buffer, then data may be read from the ping buffer. In other examples, the term "ping-pong buffer" may refer to a double buffer (e.g., the ping buffer and the pong buffer) in which data may be written to one of the buffers (e.g., the ping buffer or pong buffer) one at a time. During read, however, the ping and pong buffers may be virtually contiguous memory space such that while data is being written to only one of the buffers, data may be read from both buffers.

In examples where the ping-pong buffer is non-circular, the ping buffer may be an individual circular buffer and the pong buffer may be an individual circular buffer. The size of the ping-pong buffer may vary depending on the example. Display processor 14 may include a ping-pong buffer for foreground tile data, a ping-pong buffer for background tile data, and/or a ping-pong buffer for write-back tile data (e.g., tile data output by blend processing unit 140).

For example, the foreground ping-pong buffer may be 128 pixels in width and 64 pixels in height. In this example, the foreground ping buffer space may be 64×64 pixels, and the foreground pong buffer space may also be 64×64 pixels. The size of the foreground ping buffer space and the foreground pong buffer space may be based on a maximum downscale ratio that pixel processing unit 130 may be configured to perform on foreground tile data as well as the height and/or width of a tile. The height and width of the ping buffer and the pong buffer being 64 pixels is an example where the maximum downscale ratio is one-quarter (¼) because 64 pixels one-quarter downscaled is 16 pixels, which is the fixed pixel width for background tiles. One of ordinary skill in the art will thus appreciate that the foreground ping-pong buffer may be based on any scaling to be performed on the foreground data by pixel processing unit 130.

Figure 3A:
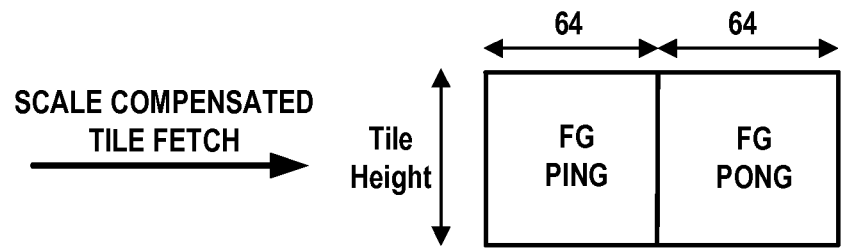
FIG. 3A is a conceptual diagram illustrating an example of writing data to a ping-pong buffer described in this disclosure.

Referring to the example where the foreground ping buffer space is 64×64 pixels and the foreground pong buffer space is 64×64 pixels, pre-fetch processing unit 100 may fetch foreground tile data in 64×tile height pixels up to 64 pixels, as shown in FIG. 3A. As shown in FIG. 3A, when pre-fetch processing unit 100 stores (e.g., writes) pre-fetched tile data to the foreground ping-pong buffer where one tile (64 pixels×tile height pixels) is pre-fetched and written in the foreground ping buffer space and another tile (64 pixels×tile height pixels) is pre-fetched and written in the foreground pong buffer space. FIG. 3A therefore shows one example of writing pre-fetched tile data to the foreground ping-pong buffer. The scale compensated tile fetch example shown in FIG. 3A is fixed at 64 pixels. As described herein, fixing the fetch at 64 pixels may ensure compliance with minimum access length (MAL).

Figure 3B:
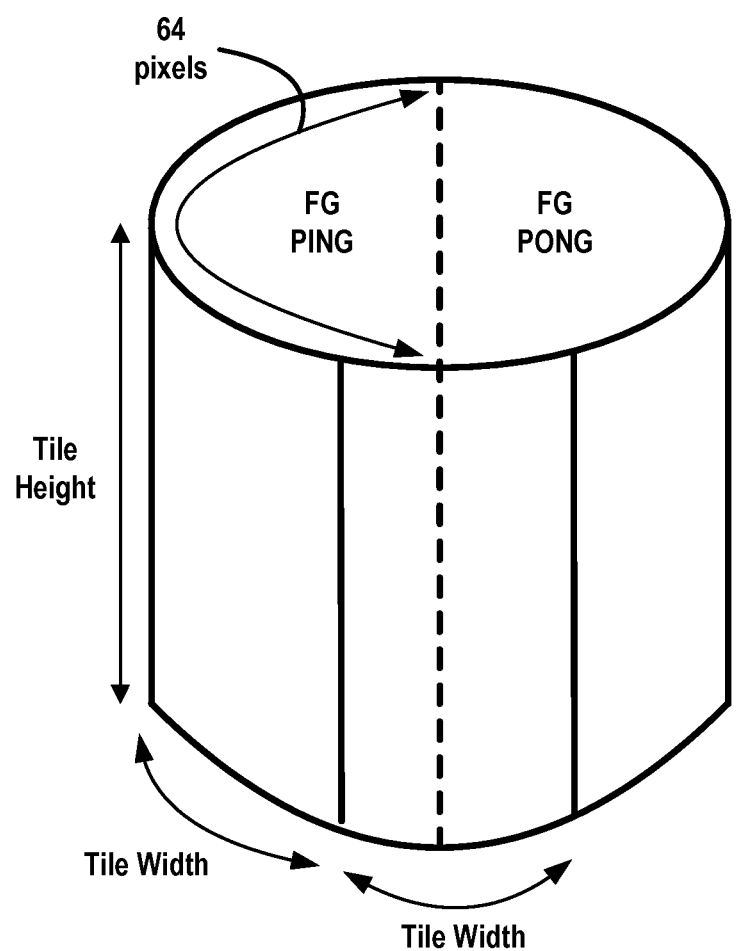
FIG. 3B is a conceptual diagram illustrating an example of reading data from a ping-pong buffer described in this disclosure.

FIG. 3B shows one example of reading (e.g., fetching) pre-fetched foreground tile data from the foreground ping-pong buffer. As shown in FIG. 3B, the foreground ping-pong buffer may be configured as a circular buffer. FIG. 3D, which is described below, illustrates the process of reading pixel data from the foreground ping-pong buffer when ping-pong buffer is configured as a circular buffer. The tiles have a size of tile width pixels×tile height pixels calculated based on a scale algorithm. Fetch processing unit 110 fetches tiles from the foreground ping-pong buffer instead of, for example, the frame buffer or memory other than shared memory 104. While the example shown in 128 bits in virtual circumference, other examples may include less bits for optimization. For example, in one example, the foreground ping-pong buffer may be 96 bits in width (and virtual circumference) while 64 pixels may still be fetched at a time.

Figure 3C:
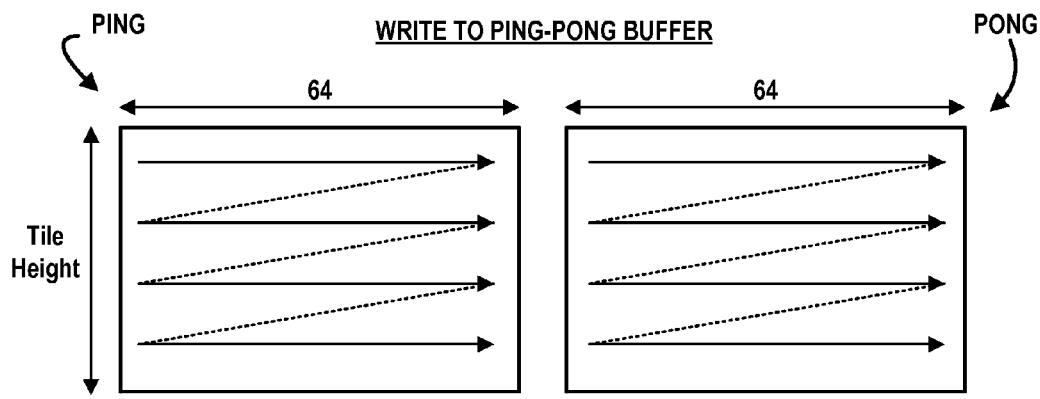
FIG. 3C is a conceptual diagram illustrating an example of writing data to one example of a ping-pong buffer described in this disclosure.
Figure 3D:
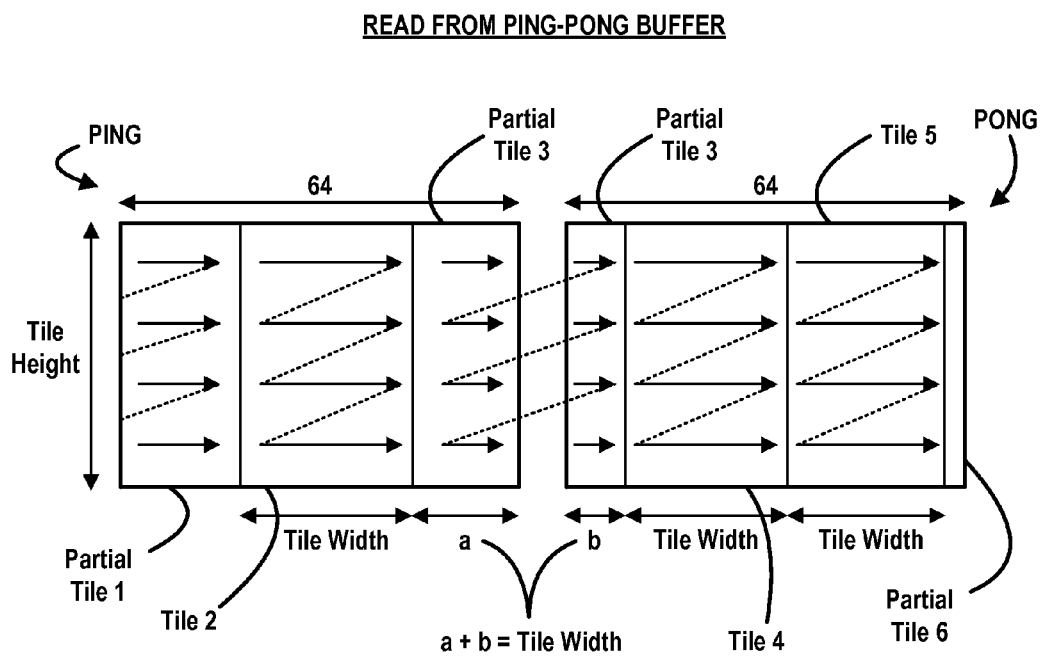
FIG. 3D is a conceptual diagram illustrating an example of reading data from one example of a ping-pong buffer described in this disclosure

FIG. 3C illustrates the process of writing pixel data into the foreground ping-pong buffer. As shown in FIG. 3C, pre-fetch processing unit 100 may be configured to pre-fetch a plurality of adjacent tiles and store the tiles in the ping-pong buffer. Fetch processing unit 110 reads the tiles from the ping-pong buffer (shown in FIG. 3D). Continuing with the 64-pixel width example for the ping and the pong buffers of the foreground-pong pong buffer, in operation, pre-fetch processing unit 100 writes pixel data one line at a time in the ping buffer. During this write process, pre-fetch processing unit 100 may be unaware as to whether each 64 pixel wide line includes one or more tiles. Once the ping buffer is filled, pre-fetch processing unit 100 switches over to the pong buffer to repeat the process. Likewise, when the pong-buffer is filled, pre-fetch processing unit 100 returns to the ping buffer to repeat the process. While pre-fetch processing unit 100 is writing data to the ping-pong buffer, fetch processing unit 110 may be reading pixel data from the ping-pong buffer. For example, while pre-fetch processing unit 100 is writing to the pong buffer, fetch processing unit 110 may be reading from the ping buffer. Likewise, while pre-fetch processing unit 100 is writing to the ping-buffer, fetch processing unit 110 may be reading from the pong buffer.

FIG. 3D illustrates the process of reading pixel data from the foreground ping-pong buffer. FIG. 3D also illustrates that pre-fetch processing unit 100 may be unaware as to the number of tiles or the completeness of tiles in each 64 pixel wide line being written to the ping buffer and the pong buffer. FIG. 3D also illustrates an example where tile data may be present in both the ping buffer and the ping buffer (e.g., the 3). In the example shown, when fetch processing unit 110 reads from the ping buffer, it reads pixel data associated with three tiles. At this time stamp, when fetch processing unit 110 reads the pong buffer to acquire the pixel data for tile 1, tile 2, and tile 3, it appears that the pixel data for tiles 1 and 3 is incomplete because the entire width of each of those tiles is not read from the ping buffer. However, fetch processing unit 110 previously read the "missing" pixels for each line for tile 1 during each its last reads of the pong buffer for each respective line. Because this is a circular buffer, conceptually there is really no "partial" tile as depicted in FIG. 3D because the ping and pong buffers may be contiguous memory space or treated contiguous memory space. Tile 3 illustrates this example with the pong buffer containing the remaining pixels for each line for tile 3. For example, for tile 3, fetch processing unit 110 begins with the top most pixel line in the pong buffer and reads that line. However, the instruction to read issued by fetch processing unit 110 is to read the number pixels based on tile width (e.g., the number of pixels corresponding to tile width). Therefore, fetch processing unit 110 continues into the pong buffer to fetch the remaining pixels for tile 3. For example, fetch processing unit 110 would fetch pixels having the width "a" in line one, then proceed to fetch pixels having the width "b" in line one of the pong buffer. Together, segments "a" and "b" make up the full line for tile 3. A similar process occurred with tile 1, except with tile 1, the beginning of each line began in the memory space at the end of the pong buffer, and was read before it was overwritten by tile 5 and tile 6 data. Tiles 4 and 5 are wholly obtained from the pong buffer, and tile 6 is partially obtained from the pong buffer with the rest being obtained from the ping buffer. Note that the rest of tile 6 will have written over tile 1 because of the circular (e.g., ring) aspect of the ping-pong buffer.

In other examples, pre-fetch processing unit 100 may fetch foreground tile data in 32 pixel-width increments, 64 pixel-width increments, or 128 pixel-width increments. Such pre-fetching may include one or more, or two or more foreground tiles. For example, pre-fetch processing unit 100 may fetch foreground tile data in 32×tile height pixels up to 32 pixels. In such an example, ping-pong buffer may be 64 pixels in width and 32 pixels in height. As another example, pre-fetch processing unit 100 may fetch foreground tile data in 128×tile height pixels up to 128 pixels. In such an example, ping-pong buffer may be 256 pixels in width and 128 pixels in height.

By pre-fetching foreground and/or background tile data, pre-fetch processing unit 100 decouples external memory (e.g., the frame buffer associated with GPU 12) and internal processing requests from display processor 14 (e.g., processing requests by fetch processing unit 110). For example, instead of fetching from on-chip memory of video codec 7, on-chip memory of GPU 12, and/or output buffer 16, fetch processing unit 110 fetches foreground and background tiles from the tile data stored in ping-pong buffer by pre-fetch processing unit 100.

Additionally, because tiles of an image to be displayed may be stored in the ping-pong buffers using different tile dimensions, pixel bit-depths, and/or color representations, fetch processing unit 110 of display processor 14 may be configured to read tile data from the ping-pong buffer in a flexible manner (e.g., corresponding to the format of the tiles and/or color components). To handle the various tile formats, pre-fetch processing unit 100 may write 64 pixels into a ping-pong buffer at a time as set forth above, and may include logic to further determine whether a particular region of a ping-pong buffer corresponds to a particular color plane (e.g., YCbCr, RGBA, etc.). One exemplary process of reading pixel data into the ping-pong buffer and partitioning the ping-pong buffers into tiles is illustrated in FIG. 3C.

As identified above, display processor 14 may include a background ping-pong buffer. Pre-fetch processing unit 100 may pre-fetch background tile data meaning that pre-fetch processing unit 100 reads background tile data from memory space other than shared memory 104 (e.g., a frame buffer) and subsequently writes the pre-fetched background tile data to the background ping-pong buffer. The background ping-pong buffer may be 64 pixels in width and 16 pixels in height. In this example, the background ping buffer may be 32 pixels in width and 16 pixels in height, and the background pong buffer may be 32 pixels in width and 16 pixels in height. Since background tiles are fixed in size to 16 pixels in width to 16 pixels in height, using a 32×16 ping buffer and a 32×16 pong buffer leads to a maximum burst size of 16. Otherwise stated, pre-fetch processing unit 100 may pre-fetch a current background tile and an adjacent horizontal tile to address bandwidth wastage and to maximize the burst length of off-chip memory up to 16. In some examples, to maximize burst length up to 16, at least 32 pixels may need to be pre-fetched. As described herein, reducing the number of memory requests to external memory, pre-fetch processing unit 100 may reduce bandwidth wastage by one or more of the following: increasing the length of memory bursts, pre-fetching foreground tile data independent of any scale ratio (e.g., pre-fetching foreground tile data according to a fixed size of, for example, 64 pixels in width regardless of any scaling ratio), removing over-fetching due to horizontal overlap, and/or reducing vertical overlap requests by half.

Similarly, display processor 14 may include a write-back ping-pong buffer. Display processor 14 may write-back (shown at block 150 in FIG. 2) blended tile data output by blend processing unit 140 to the write-back buffer. The write-back ping-pong buffer may be 64 pixels in width and 16 pixels in height. In this example, the write-back ping buffer may be 32 pixels in width and 16 pixels in height, and the write-back pong buffer may be 32 pixels in width and 16 pixels in height.

In some examples, pre-fetch processing unit 100 may be configured to pre-fetch (e.g., read) foreground tile data and background tile data in parallel. In other examples, pre-fetch processing unit 100 may be configured to pre-fetch foreground tile data and background tile data sequentially or otherwise not in parallel. Availability of foreground tiles and background tiles in ping-pong buffer space (or any buffer space) due to the pre-fetching performed by pre-fetch processing unit 100 may enable the parallel reading of foreground and background tiles from memory (e.g., ping-pong memory space) by fetch processing unit 110.

FIG. 4A depicts an example where a foreground pixel and a background pixel is available for blending in a single clock cycle. In the example shown, there are 32 pixels per line. However, in other examples, there may be 16 pixels per line, 64 pixels per line, or any other number of pixels per line. FIG. 4B depicts an example where foreground tile pixels (e.g., luma and chroma formatted pixels) and a background pixel (e.g., a ARGB formatted pixel) are available for blending in a single clock cycle. In the example shown, there are 32 pixels per line. However, in other examples, there may be 16 pixels per line, 64 pixels per line, or any other number of pixels per line.

Fetch processing unit 110 may be configured to fetch the first foreground tile and the first background tiles in parallel, and fetch the second foreground tile and the second background tiles in parallel while the display processor conducts pixel processing on the fetched first foreground tile. Pre-fetch processing unit 100 of display processor 14 may therefore reduce or eliminate inefficient processing that would otherwise be present absent the pre-fetch processing unit 100. For example, pre-fetch processing unit 100 may enable fetch processing unit 110 to perform more actions in parallel thereby saving processing resources.

As another example, utilization of pre-fetch processing unit 100 may reduce the number of initial memory requests for display processor 14 to obtain tile data. In this example, memory requests may be reduced because pre-fetch processing unit 100 may obtain a larger amount of tile data per request than compared to what fetch processing unit 110 is configured to request. In one example, pre-fetch processing unit 100 may, in a single memory request, read tile data corresponding to more than one tile whereas fetch processing unit 110 may be configured to read tile data corresponding to a single tile. Otherwise stated, pre-fetch processing unit 100 makes less fine-tuned memory requests to memory other than shared memory 104 whereas fetch processing unit 110 makes more fine-tuned memory requests to shared memory 104. By doing so, pre-fetch processing unit 100 may reduce the number of memory requests display processor 14 makes (e.g., transmits) to memory other than shared memory 104.

In some examples, foreground and background tile (or tile data) pre-fetching is performed by pre-fetch processing unit 100 serially (e.g., round-robin fashion). In other examples, foreground and background tile (or tile data) pre-fetching is performed by pre-fetch processing unit 100 using priority arbitration techniques. Additional detail concerning pre-fetch processing unit 100 is provided throughout this disclosure.

The foreground, background, and write-back ping-pong buffers may be separate or contiguous memory space in memory (e.g., shared memory 104). Display processor 14 may dynamically allocate memory space for the foreground, background, and write-back ping-pong buffers in memory (e.g., shared memory 104) based on rotation and downscaling values of the image to be displayed. For example, FIG. 5A shows an example where display processor 14 has allocated four 64×32 pixel regions for the foreground ping-pong buffer, one 16×16 pixel region for the background ping-pong buffer, and one 16×16 pixel region for the write-back ping-pong buffer. In some examples, display processor 14 may deem such an allocation appropriate when the image to be displayed needs to be downscaled by less than one-third (⅓) and is not to be rotated, or when the image to be displayed needs to be downscaled by less than two-thirds (⅔) and is to be rotated. The different regions of memory shown in FIG. 5A may or may not be contiguous.

FIG. 5B depicts another example of memory allocation for ping-pong buffers. In this example, display processor 14 has allocated two 64×32 pixel regions and two 64×16 pixel regions for the foreground ping-pong buffer, two 32×16 pixel regions for the background ping-pong buffer, and two 32×16 pixel regions for the write-back ping-pong buffer. In some examples, display processor 14 may deem such an allocation appropriate when the image to be displayed needs to be downscaled by a ratio of one-third (⅓) or greater and is not to be rotated, or when the image to be displayed needs to be downscaled by a ratio of two-thirds (⅔) or greater and is to be rotated. The different regions of memory shown in FIG. 5B may or may not be contiguous.

FIGS. 5A and 5B are conceptual; however, they depict that display processor 14 may reduce memory space consumption by the ping-pong buffers when the scaling ratio increases. For example, the memory allocated for the ping-pong buffers in FIG. 5B has 32×32 pixels less than the memory allocated for the ping-pong buffers in FIG. 5A. As described herein, ping-pong buffer memory may be allocated based on, among other things, a scaling factor to be applied to foreground tile data. For example, the memory allocated for ping-pong buffer memory for foreground data may be equated to: (1) Ping-Pong Buffer Width=16 divided by scaling factor and (2) Ping-Pong Buffer Height=16 divided by scaling factor. For example, a downscaling factor of ¼ would equate to a ping-pong buffer having a size of 64×64 pixels whereas a downscaling factor of ½ would equate to a ping-pong buffer having a size of 32×32.

In some examples, display processor 14 may reduce or eliminate over fetching of pixels due to scaling because such pixels are already in the foreground ping-pong buffer that holds tile data for more than just a single tile. In some examples, pre-fetch processing unit 100 may reduce or eliminate pixel line re-fetching due to vertical tile overlap. In some examples, display processor 14 may reduce the number off-chip memory requests by using pre-fetch processing unit 100.

Figure 6:
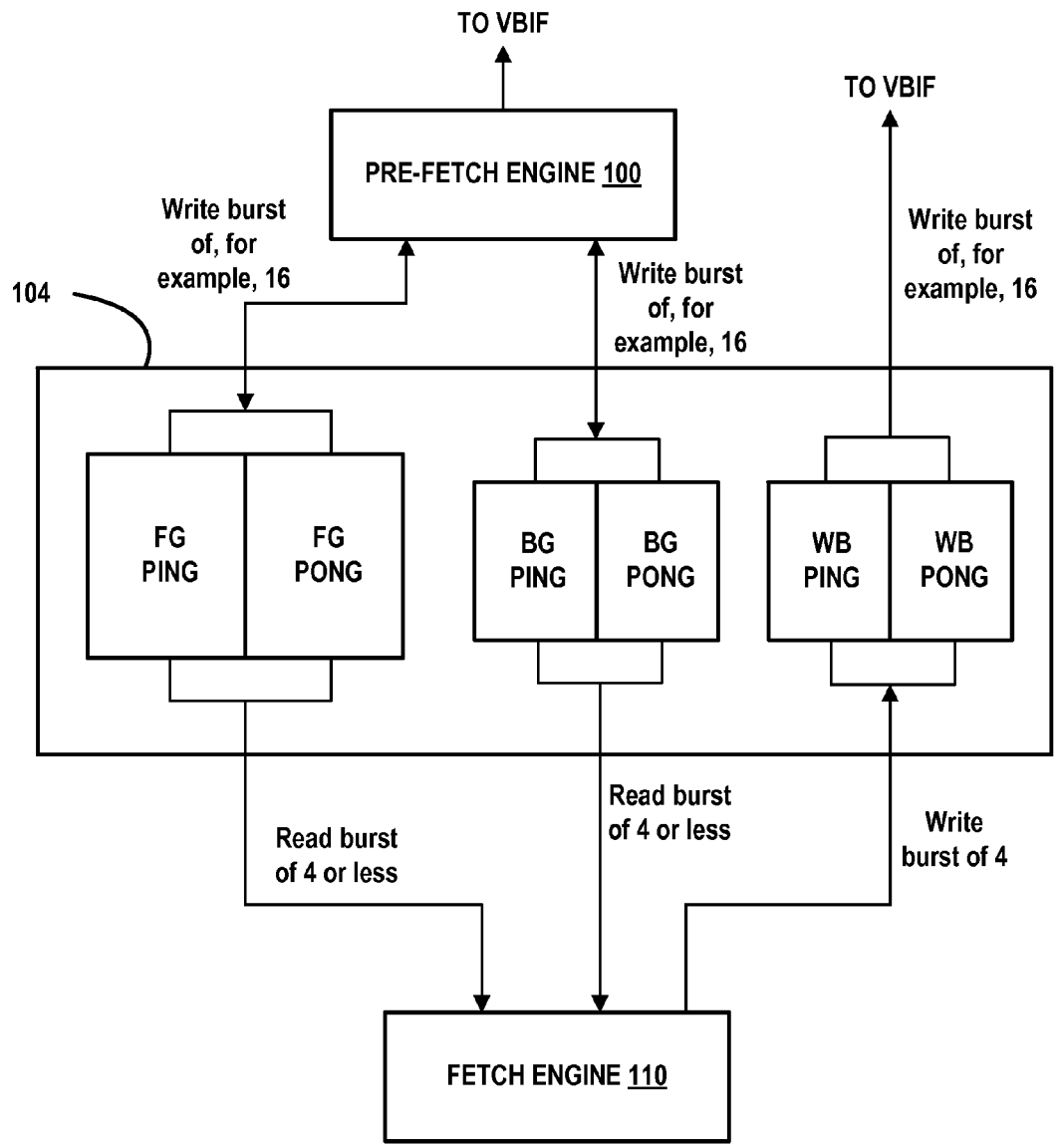
FIG. 6 is a block diagram illustrating foreground, background, and write-back ping-pong buffers in accordance with the techniques described herein.

FIG. 6 is a conceptual diagram illustrating foreground, background, and write-back ping-pong buffers in accordance with the techniques described herein. In some examples, a ping-pong buffer may be configured to be virtually divided into a plurality of regions with each region corresponding to a pixel type of pseudo planar format (e.g., luma, chroma, and/or alpha).

In the case of pseudo planar format, one tile comprises interleaved lines from luma and chroma tiles. In this format, fetch processing unit 110 fetches each line of a luma tile and a chroma tile in alternating fashion in a zig-zag pattern from shared memory 104 to create a luma-chroma tile before sending such a tile to either pixel processing unit 130 or blend processing unit 140. For example, fetch processing unit 110 may start from the top left most pixel of the luma tile and proceed to fetch all pixels on the first line of the luma tile stored in shared memory 104 by virtue of being pre-fetched by pre-fetch processing unit 100. Next, fetch processing unit 110 starts from the top left most pixel of the chroma tile and fetches all pixels on the first line of the chroma tile. Next, fetch processing unit 110 moves to the second line of the luma tile and starts from the left most pixel to fetch all pixels on the second line of the luma tile. Next, fetch processing unit 110 moves to the second line of the chroma tile and starts from the left most pixel to fetch all pixels on the second line of the chroma tile. This process continues until fetch processing unit 110 reaches the bottom right most pixel in the luma and chroma tiles.

In some examples, pre-fetch processing unit 100 conversely pre-fetches (e.g., reads) the luma and chroma tiles separately without alternating lines during fetching (or at least fetches two or more lines before alternating planes). Since both plane data (e.g., the luma tile data and the chroma tile data) are stored separately in a contiguous memory location (e.g., frame buffer or other memory other than shared memory 104), constantly switching between the planes after every line results in opening a higher number of pages of DDR in an example involving DDR memory space. The techniques of this disclosure may be implemented to improve the efficiency of DDR memory efficiency (or any other memory to which pre-fetch processing unit 100 issues memory requests) by not switching between planes after every line during the fetching process. Otherwise stated, pre-fetch processing unit 100 may not alternate between reading each line of the luma and chroma tiles when reading the luma and chroma tile data from memory (e.g., DDR memory). In this way, pre-fetch processing unit 100 does not switch between different planes (e.g., luma and chroma) when communicating memory requests to the memory thereby improving the efficiency of reading the data from memory because less communication overhead is involved (e.g., in the alternated fashion, each line requires a separate memory request when reading luma and chroma lines in alternated fashion; whereas in the non-alternated fashion, one memory request can include a span of memory space that includes more than one line of a tile). Otherwise stated, pre-fetch processing unit 100 may reduce the number of read requests by not pre-fetching each line from luma and chroma tiles in alternated fashion. Less plane switching results in less memory requests, which also saves bandwidth (e.g., reduces bandwidth consumption) and memory workload.

As identified above, pre-fetch processing unit 100 may also reduce the number of memory requests by pre-fetching two or more lines of luma and chroma at a time in alternating fashion. However, the memory request reduction in this example is less than the memory reduction example where no plane switching.

While the example above relates to pre-fetch processing unit 100 not fetching luma and chroma lines in an interleaved/alternating fashion, it is understood that pre-fetch processing unit 100 may perform similar processing for other such tiles. For example, a tile that contains three interleaved lines from three tiles (e.g., luma, chroma, and alpha) may similarly be pre-fetched such that each line a first block is pre-fetched, then each line of a second block is pre-fetched, and then each line of a third block is pre-fetched. In some examples, pre-fetching each line of each of the first, second, and third blocks may be performed in parallel by pre-fetch processing unit 100. As described herein, pre-fetch processing unit 100 may reduce memory requests by leaving the building of the interleaved tile to fetch processing unit 110.

In some examples, bandwidth may be wasted when pre-fetching (e.g., reading) or writing a non-aligned tile because such a tile violates the minimum access length (MAL) requirement when accessing off-chip memory (e.g., Double Data Rate (DDR) memory) or any memory location other than shared memory 104. Violating the MAL requirement may result in display processor 14 having to pad bits (e.g., waste bits and therefore bandwidth) so as to be compliant with the MAL requirement (e.g., 32, 64, or 128 bytes in current DDR memory). In other examples, display processor may not pad unused bits, but bandwidth wastage may nonetheless result. For example, in DDR-3, the minimum DRAM burst length may be 8. In this example, assuming an LPDDR3 data width of 32 bits, the DRAM fetches 32×8=256 bits (or 32 bytes) of data every access. This in turn takes 8 DRAM half cycles (i.e., 4 cycles) to transfer data between the display processor and the DRAM. Otherwise stated, the DRAM is accessed in a minimum of 4 cycle boundaries. If the request is less than 32 bytes, idle cycles will be introduced to cover the four cycles. Therefore, if, for example, all the bursts in this example are 16 bytes long, only 50% of the available DRAM bandwidth can be utilized. The techniques of this disclosure may be implemented to reduce or remove this bandwidth wastage by, for example, removing or reducing any padding of bits, or removing or reducing the amount of unused memory cycles. For example, pre-fetch processing unit 100 may pre-fetch each line of foreground tile data in fixed, 64 pixels increments. In such examples, all memory requests by pre-fetch processing unit 100 may be aligned to have a minimum access length (MAL) of 64, 128, 196, or 256 without having to pad any bits to be compliant with MAL.

As another example, a tile size may vary based on a scale ratio, horizontal overlap, and/or vertical overlap involved due to a scale algorithm. One line of tile data may be equal to (Tile Width+Horizontal Overlap)×BPP (Bits Per Pixel), where BPP depends on the input format. This calculation may not be in multiples of 32 bytes. However, DDR minimum access length or granularity may be 32, 64, 128, and 256, for example. In such an example, every time one line of data is not a multiple of the MAL, bandwidth wastage may result. Display processor 14 may be configured to pre-fetch data from memory (e.g., any type of DDR memory) in a MAL-aligned manner according to one or more techniques of this disclosure. For example, display processor 14 may be configured to pre-fetch data from memory in 32 byte increments if the MAL is 32 bytes for the memory. As another example, display processor 14 may be configured to pre-fetch data from memory in 64 byte increments if the MAL is 64 bytes for the memory. As another example, display processor 14 may be configured to pre-fetch data from memory in 128 byte increments if the MAL is 128 bytes for the memory. Depending on the size of the pre-fetched data (e.g., 32 bytes, 64 bytes, etc.), the size of one or more ping-pong buffers described herein may be adjusted.

Figure 7A:
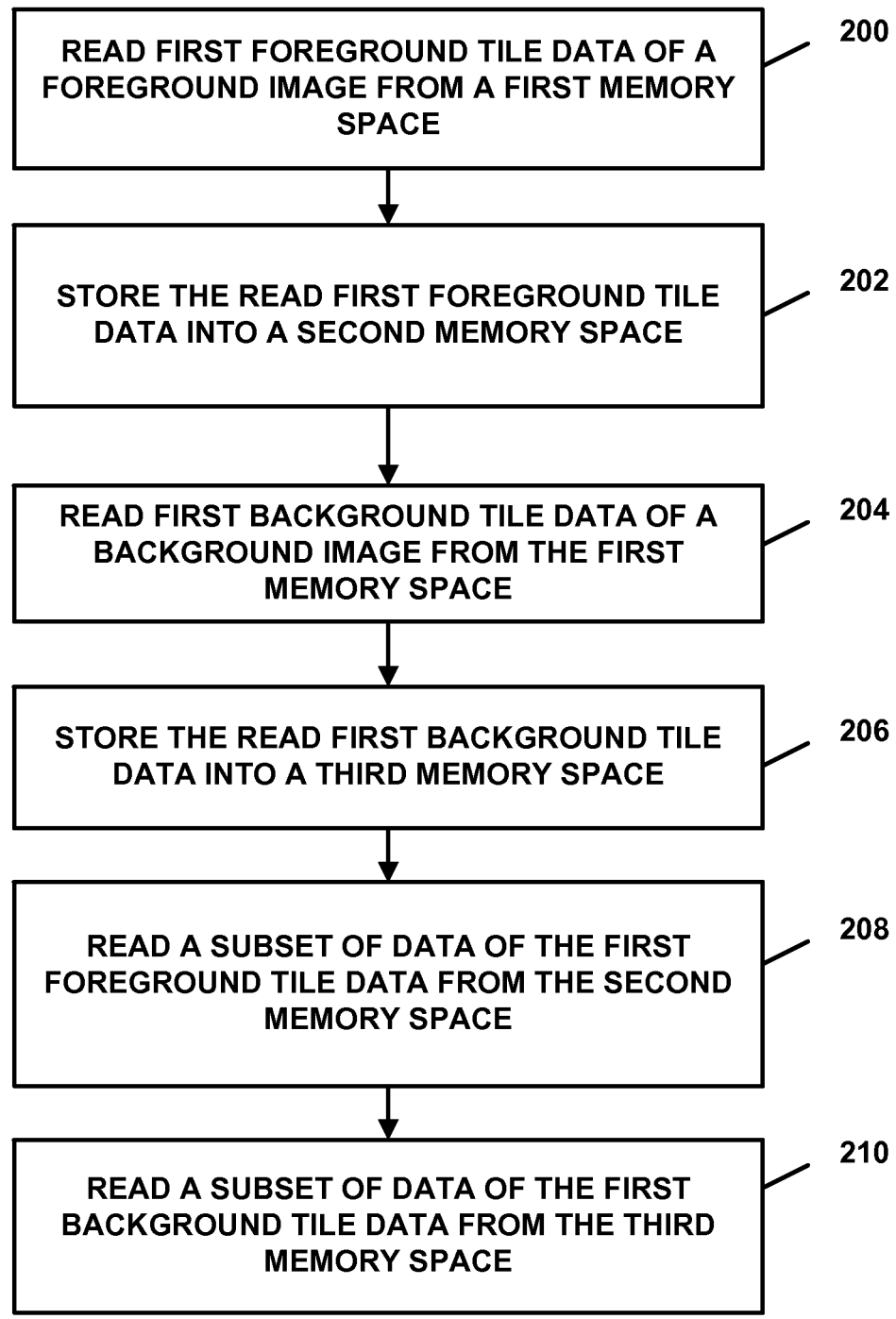
FIG. 7A is a flowchart illustrating an example process consistent with techniques for display processing of this disclosure.

FIG. 7A is a flowchart illustrating an example process consistent with techniques for display processing of this disclosure. For example, FIG. 7A is one example of operation of display processor 14 depicted in FIG. 2. The process of FIG. 7A is generally described as being performed by display processor 14 for purposes of illustration, although a variety of other processors may also carry out the process shown in FIG. 7A. In some examples, pre-fetch processing unit 100 and/or fetch processing unit 110 may perform one or more processes shown in FIG. 7A.

In the example of FIG. 7A, display processor 14 may read (200) first foreground tile data of a foreground image from a first memory space. In some examples, display processor 14 may store (202) the read first foreground tile data into a second memory space. Display processor 14 may read (204) first background tile data of a background image from the first memory space. Display processor 14 may store (206) the read first background tile data into a third memory space. Display processor 14 may read (208) a subset of data of the first foreground tile data from the second memory space. Display processor 14 may read (210) a subset of data of the first background tile data from the third memory space. Display processor 14 may process pixels of the subset of data of the first foreground tile data. Display processor 14 may blend processed pixels of the subset of data of the first foreground tile data with pixels of the subset of data of the first background tile data to generate blended tile data. Display processor 14 may store the blended tile data into a fourth memory space. In some examples, the first memory space may be a frame buffer, the second memory space may be a foreground ping-pong buffer, the third memory space may be a background ping-pong buffer, and/or the fourth memory space may be a write-back ping-pong buffer.

Figure 7B:
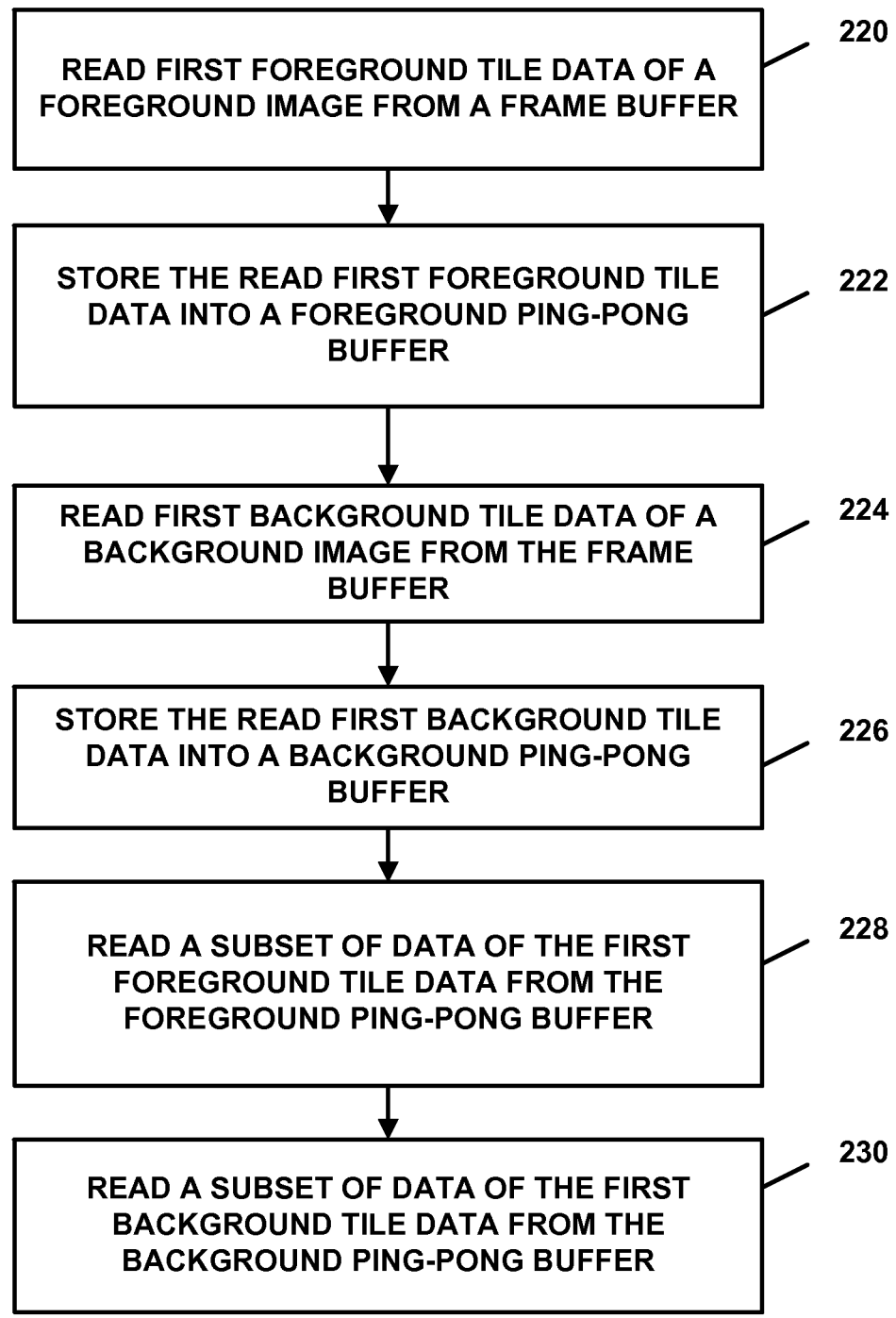
FIG. 7B is a flowchart illustrating an example process consistent with techniques for display processing of this disclosure.

FIG. 7B is a flowchart illustrating another example process consistent with techniques for display processing of this disclosure. For example, FIG. 7B is one example of operation of display processor 14 depicted in FIG. 2. The process of FIG. 7B is generally described as being performed by display processor 14 for purposes of illustration, although a variety of other processors may also carry out the process shown in FIG. 7B. In some examples, pre-fetch processing unit 100 and/or fetch processing unit 110 may perform one or more processes shown in FIG. 7B.

In the example of FIG. 7B, display processor 14 may read (220) first foreground tile data of a foreground image from a frame buffer. Display processor 14 may store (222) the read first foreground tile data into a foreground ping-pong buffer. Display processor 14 may read (224) first background tile data of a background image from the frame buffer. Display processor 14 may store (226) the read first background tile data into a background ping-pong buffer. Display processor 14 may read (228) a subset of data of the first foreground tile data from the foreground ping-pong buffer. Display processor 14 may read (230) a subset of data of the first background tile data from the background ping-pong buffer.

Figure 8:
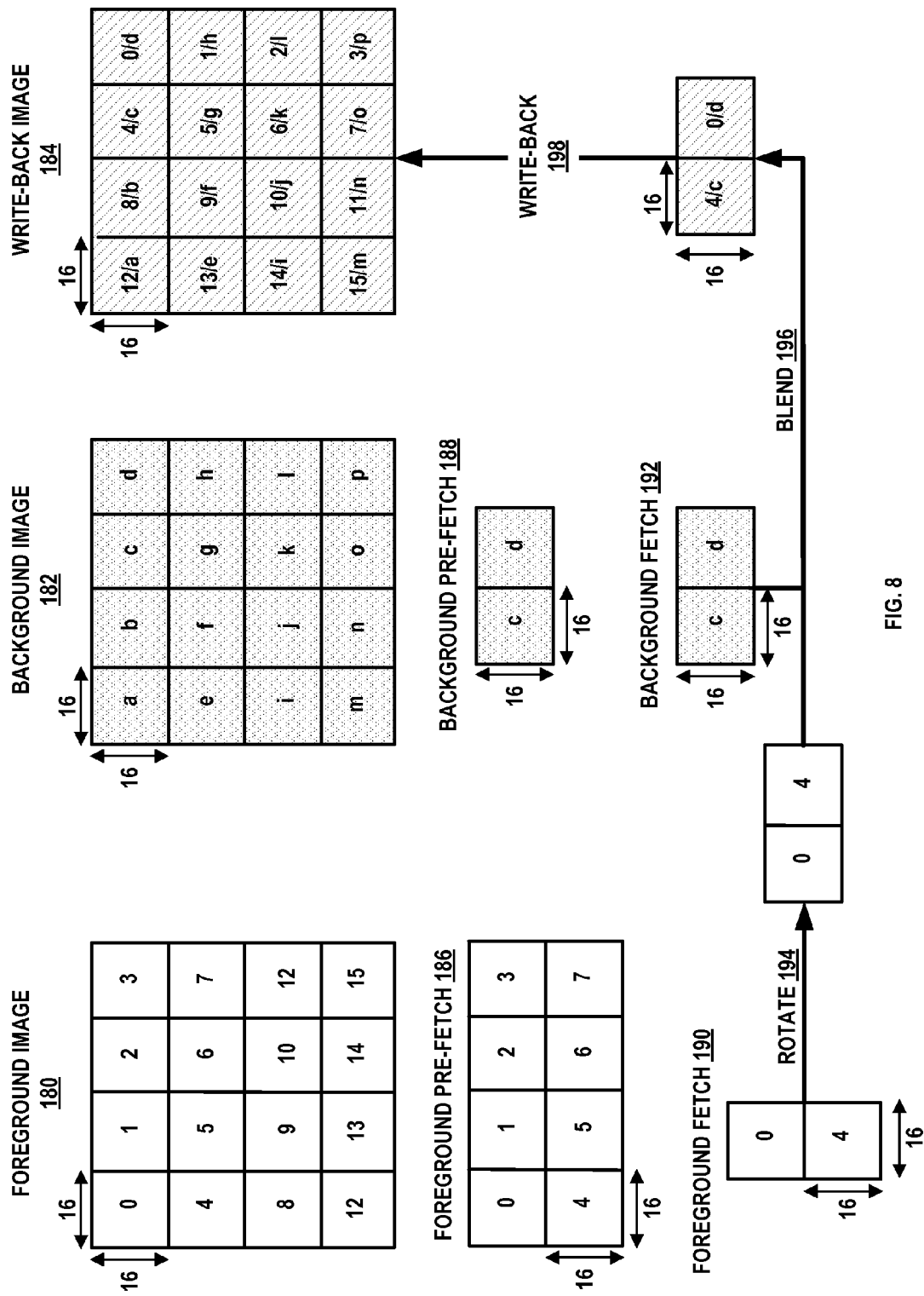
FIG. 8 is a conceptual diagram illustrating an example of tile-based processing of a display processor described in this disclosure.

FIG. 8 illustrates a conceptual diagram showing one example of tile-based processing of display processor 14, and more particularly, to an example when display processor 14 rotates the foreground layer image data relative to the background layer image data. FIG. 8 shows foreground image 180, background image 182, and blended image 184. Foreground image 180 and background image 182 may have been output by GPU 12 and stored in a frame buffer (e.g., output buffer 16). In this example, foreground image 180 includes tiles 0-15 and background image 182 includes tiles a-p. Write-back image 184 includes blended tiles as depicted. The example shown in FIG. 8 is shown for purposes of describing how display processor 14 may perform rotation of the foreground image (or tiles thereof) to blend with a rotated background image (or tiles thereof).

Pre-fetch processing unit 100 performs a foreground pre-fetch 186 and a background pre-fetch 188. Foreground pre-fetch 186 and background pre-fetch 188 may or may not occur in parallel. Foreground pre-fetch 186 stores pre-fetched foreground tile data, which in this example would be tiles 0-7, into foreground ping-pong buffer accessible to display processor 14. Background pre-fetch 188 stores pre-fetched background tile data, which in this example would be tiles c and d, into background ping-pong buffer accessible to display processor 14.

Fetch processing unit 110 performs a foreground fetch 190 and a background fetch 192. Foreground fetch 190 and background fetch 192 may or may not occur in parallel. Foreground fetch 190 may read one or more tiles (or two or more tiles from the foreground ping-pong buffer). In this example, fetch processing unit 110 reads (e.g., fetches) two tiles of foreground data (tiles 0 and 4) from the foreground ping-pong buffer. Background fetch 192 may read one or more tiles (or two or more tiles from the foreground ping-pong buffer). In this example, fetch processing unit 110 reads (e.g., fetches) two tiles of background data (tiles c and d) from the background ping-pong buffer.

Pixel processing unit 130 may rotate (depicted as rotate 194 in FIG. 8) the fetched foreground tile data, which in this example would be tiles 0 and 4 oriented vertically, to be in accordance with the rotated background image 182. In this example, the fetched foreground tile data is rotated 90 degrees counterclockwise so that tiles 0 and 4 are oriented horizontally like the fetched background tile data. In some examples, the rotation of fetched foreground data shown may be performed while fetch processing unit 110 is performing background fetch 192. In other examples, the rotation of fetched foreground data shown may be performed after foreground fetch 190 and background fetch 192 are performed.

Blend processing unit 140 of display processor 14 may blend (depicted as blend 96 in FIG. 8) the rotated fetched foreground tile data (e.g., tiles 0 and 4) and the fetched background tile data (e.g., tiles c and d) to generate blended tile data (e.g., tiles 4/c and 0/d). Blended tile data may be written back (depicted as write-back 198 in FIG. 8) to a write-back ping-pong buffer.

In the example shown in FIG. 8, the entire processing sequence is not depicted. In some examples, the processing sequence may be as described in this paragraph. In other examples, the processing sequence may different than the processing sequence described in this paragraph. Pre-fetch processing unit 100 may be configured to pre-fetch tiles 0-15 in the following order: 0, 4, 1, 5, 2, 6, 3, 7, 8, 12, 9, 13, 10, 14, 11, 15. In some examples, tiles 0-7 may be pre-fetched first, and tiles 8-15 may be pre-fetched second. In other examples, one or more tiles 0-15 may be pre-fetched. Any pre-fetching of tiles 0-15 may or may not be pre-fetched in parallel with any pre-fetching of tiles a-p. Pre-fetch processing unit 100 may be configured to pre-fetch tiles a-p in the following order: d, c, h, g, l, k. p, o, b, a, f, e, j, i, n, m. In some examples, tiles d and c may be pre-fetched first, tiles h and g may be pre-fetched second, tiles l and k may be pre-fetched third, tiles p and o may be pre-fetched fourth, tiles b and a may be pre-fetched fifth, tiles f and e may be pre-fetched sixth, tiles j and i may be pre-fetched seventh, and tiles n and m may be pre-fetched eighth. In other examples, one or more tiles a-p may be pre-fetched. Any pre-fetching of tiles a-p may or may not be pre-fetched in parallel with any pre-fetching of tiles 0-15. In some examples, display processor 14 may be configured to write back blended tiles to memory according to the following sequence: 0/d, 4/c, 1/h, 5/g, 2/l, 6/k, 3/p, 7/o, 8/b, 12/a, 9/f, 13/e, 10/j, 14/i, 11,/n, 15/m. In some examples, display processor 14 may be configured to write back the blended tiles in accordance with the sequence above in groups of two or more tiles. For example, display processor 14 may be configured to first write back tiles 0/d and 4/c, then display processor 14 may be configured to write back tiles 1/h and 5/g, and the like. In some examples, display processor 14 may be configured to increase the burst length of memory requests by following the above processing sequence. For example, display processor 14 may be configured to increase the burst length of memory requests by pre-fetching horizontally adjacent background tiles.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed:
1. A method for tile-based processing by a display processor, the method comprising:
   reading, by a pre-fetch processing unit of the display processor, first foreground tile data of a foreground image layer of a multi-layer visual content from a first memory space, the foreground image layer comprising a video layer;
   storing, by the pre-fetch processing unit of the display processor, the read first foreground tile data into a first buffer of a foreground ping-pong buffer without downscaling the first foreground tile data, the foreground ping-pong buffer comprising a ring buffer;
   reading, by the pre-fetch processing unit of the display processor, first background tile data of a background image layer of the multi-layer visual content from the first memory space, the background image layer comprising a graphics layer;
   storing, by the pre-fetch processing unit of the display processor, the read first background tile data into a first buffer of a background ping-pong buffer without downscaling the first background tile data;
   reading, by a fetch processing unit of the display processor, a subset of data of the first foreground tile data from the first buffer of the foreground ping-pong buffer while the pre-fetch processing unit of the display processor stores second foreground tile data read from the first memory space into a second buffer of the foreground ping-pong buffer;
   reading, by the fetch processing unit of the display processor, a subset of data of the first background tile data from the first buffer of the background ping-pong buffer while the pre-fetch processing unit of the display processor stores second background tile data read from the first memory space into a second buffer of the background ping-pong buffer; and processing pixels from the first foreground tile data of the foreground image layer and the first background tile data of the background image layer by the display processor, wherein the processing includes downscaling at least one of the first foreground tile data of the foreground image layer and the first background tile data from the background image layer.

2. The method of claim 1, further comprising processing pixels of the subset of data of the first foreground tile data.

3. The method of claim 2, further comprising generating blended tile data by blending the processed pixels of the subset of data of the first foreground tile data with pixels of the subset of data of the first background tile data.

4. The method of claim 3, further comprising storing the blended tile data into a second memory space.

5. The method of claim 4, wherein the first memory space is a frame buffer, and wherein the second memory space is a write-back ping-pong buffer.

6. The method of claim 1, wherein the first foreground tile data comprises at least one tile of the foreground image layer, and wherein the first background tile data comprises at least one tile of the background image layer.

7. The method of claim 1, wherein the first foreground tile data comprises at least two tiles of the foreground image layer, and wherein the first background tile data comprises at least two tiles of the background image layer.

8. The method of claim 1, wherein the subset of data of the first foreground tile data comprises at least one tile of the foreground image layer, and wherein the subset of data of the first background tile data comprises at least one tile of the background image layer.

9. The method of claim 1, wherein the subset of data of the first foreground tile data comprises at least two tiles of the foreground image layer, and wherein the subset of data of the first background tile data comprises at least two tiles of the background image layer.

10. The method of claim 1, wherein reading and storing the foreground tile data occurs before reading and storing the background tile data.

11. The method of claim 1, wherein reading and storing the foreground tile data occurs in parallel with reading and storing the background tile data.

12. The method of claim 1, further comprising determining a size for at least one of the foreground ping-pong buffer or the background ping-pong buffer based on foreground tile data scaling information or background tile data rotation information.

13. The method of claim 12, further comprising allocating memory for at least one of the foreground ping-pong buffer or the background ping-pong buffer based on the size.

14. The method of claim 1, wherein chroma and luma pixels of the first foreground tile data are segregated in the foreground ping-pong buffer.

15. The method of claim 3, further comprising storing the blended tile data in a write-back ping-ping buffer.

16. A computing device comprising:
a first memory space;
a foreground ping-pong buffer comprising a ring buffer for storing foreground tile data of a foreground image layer of a multi-layer visual content without downscaling the foreground tile data, the foreground image layer comprising a video layer;
a background ping-pong buffer for storing background tile data of a background image layer of the multi-layer visual content, the background image layer comprising a graphics layer without downscaling the background tile data; and a display processor including a pre-fetch processing unit and a fetch processing unit,
wherein the pre-fetch processing unit is configured to read first foreground tile data of the foreground image layer from the first memory space, store the read first foreground tile data into a first buffer of the foreground ping-pong buffer, read first background tile data of the background image layer from the first memory space, and store the read first background tile data into a first buffer the background ping-pong buffer,
wherein the fetch processing unit is configured to read a subset of data of the first foreground tile data from the first buffer of the foreground ping-pong buffer while the pre-fetch processing unit stores second foreground tile data read from the first memory space into a second buffer of the foreground ping-pong buffer, and read a subset of data of the first background tile data from the first buffer of the background ping-pong buffer while the pre-fetch processing unit stores second background tile data read from the first memory space into a second buffer of the background ping-pong buffer, and
wherein the display processor is configured to process pixels from the first foreground tile data of the foreground image layer and the first background tile data of the background image layer, wherein to process pixels includes the display processor configured to downscale at least one of the first foreground tile data of the foreground image layer and the first background tile data from the background image layer.

17. The computing device of claim 16, wherein the computing device further comprises a pixel processing unit configured to process pixels of the subset of data of the first foreground tile data.

18. The computing device of claim 17, wherein the computing device further comprises a blend processing unit configured to blend processed pixels of the subset of data of the first foreground tile data with pixels of the subset of data of the first background tile data to generate blended tile data.

19. The computing device of claim 18, wherein the display processor is further configured to store the blended tile data into a second memory space.

20. The computing device of claim 19, wherein the first memory space is a frame buffer, and wherein the second memory space is a write-back ping-pong buffer.

21. The computing device of claim 16, wherein the first foreground tile data comprises at least one tile of the foreground image layer, and wherein the first background tile data comprises at least one tile of the background image layer.

22. The computing device of claim 16, wherein the first foreground tile data comprises at least two tiles of the foreground image layer, and wherein the first background tile data comprises at least two tiles of the background image layer.

23. The computing device of claim 16, wherein the subset of data of the first foreground tile data comprises at least one tile of the foreground image layer, and wherein the subset of data of the first background tile data comprises at least one tile of the background image layer.

24. The computing device of claim 16, wherein the subset of data of the first foreground tile data comprises at least two tiles of the foreground image layer, and wherein the subset of data of the first background tile data comprises at least two tiles of the background image layer.

25. The computing device of claim 16, wherein the pre-fetch processing unit is configured to read and store the foreground tile data before reading and storing the background tile data.

26. The computing device of claim 16, wherein the pre-fetch processing unit is configured to read and store the foreground tile data in parallel with reading and storing the background tile data.

27. The computing device of claim 16, wherein the pre-fetch processing unit is configured to determine a size for at least one of the foreground ping-pong buffer or the background ping-pong buffer based on foreground tile data scaling information or background tile data rotation information.

28. The computing device of claim 27, wherein the pre-fetch processing unit is configured to allocate memory for at least one of the foreground ping-pong buffer or the background ping-pong buffer based on the size.

29. A non-transitory computer-readable storage medium having instructions stored thereon that, when executed, cause one or more processors of a computing device to:
    read first foreground tile data of a foreground image layer of a multi-layer visual content from a first memory space, the foreground image layer comprising a video layer;
    store the read first foreground tile data into a first buffer of a foreground ping-pong buffer without downscaling the first foreground tile data, the foreground ping-pong buffer comprising a ring buffer;
    read first background tile data of a background image layer of the multi-layer visual content from the first memory space, the background image layer comprising a graphics layer;
    store the read first background tile data into a first buffer of a background ping-pong buffer without downscaling the first background tile data;
    read a subset of data of the first foreground tile data from the first buffer of the foreground ping-pong buffer while second foreground tile data read from the first memory space is being stored into a second buffer of the foreground ping-pong buffer;
    read a subset of data of the first background tile data from the first buffer of the background ping-pong buffer while second background tile data read from the first memory space is being stored into a second buffer of the background ping-pong buffer; and
    process pixels from the first foreground tile data of the foreground image layer and the first background tile data of the background image layer by the display processor, wherein instructions to cause the one or more processors to process includes instructions to cause the one or more processors to downscale at least one of the first foreground tile data of the foreground image layer and the first background tile data from the background image layer.

30. The non-transitory computer-readable storage medium of claim 29, wherein the instructions, when executed, cause one or more processors of a computing device to:
    process pixels of the subset of data of the first foreground tile data;
    blend the processed pixels of the subset of data of the first foreground tile data with pixels of the subset of data of the first background tile data to generate blended tile data; and
    store the blended tile data into a second memory space, wherein the first memory space is a frame buffer, and wherein the second memory space is a write-back ping-pong buffer.

* * * * *